(12) United States Patent
Mrozinski

(10) Patent No.: US 12,580,942 B2
(45) Date of Patent: Mar. 17, 2026

(54) SYSTEM AND METHOD FOR NETWORK PENETRATION TESTING

(71) Applicant: Booz Allen Hamilton Inc., McLean, VA (US)

(72) Inventor: Christopher Laurence Mrozinski, Annapolis Junction, MD (US)

(73) Assignee: BOOZ ALLEN HAMILTON, INC., McLean, VA (US)

( * ) Notice: Subject to any disclaimer, the term of this patent is extended or adjusted under 35 U.S.C. 154(b) by 222 days.

(21) Appl. No.: 18/328,013

(22) Filed: Jun. 2, 2023

(65) Prior Publication Data

US 2024/0007494 A1     Jan. 4, 2024

Related U.S. Application Data

(60) Provisional application No. 63/357,052, filed on Jun. 30, 2022.

(51) Int. Cl.
*H04L 9/40* (2022.01)

(52) U.S. Cl.
CPC ...... *H04L 63/1433* (2013.01); *H04L 63/1408* (2013.01)

(58) Field of Classification Search
CPC ........................... H04L 63/1433; H04L 63/08
See application file for complete search history.

(56) References Cited

U.S. PATENT DOCUMENTS

| | | | |
|---|---|---|---|
| 8,356,353 B2 | 1/2013 | Futoransky et al. | |
| 10,454,966 B2 * | 10/2019 | Gorodissky | ......... H04L 63/1408 |

(Continued)

FOREIGN PATENT DOCUMENTS

| | | |
|---|---|---|
| CN | 102468985 B | 3/2016 |
| CN | 110162977 A | 8/2019 |

(Continued)

OTHER PUBLICATIONS

International Search Report and Written Opinion of the International Searching Authority (Forms PCT/ISA/220, PCT/ISA/210, and PCT/SA/237) issued on Sep. 11, 2023, by the U.S. Patent & Trademark Office in corresponding International Application No. PCT/US23/24231. (12 pages).

(Continued)

*Primary Examiner* — Sarah Su
(74) *Attorney, Agent, or Firm* — Buchanan Ingersoll & Rooney PC

(57) ABSTRACT

Embodiments relate to methods and systems for executing methods for penetration testing a network. The method involves receiving a first configuration file including network configuration information pertaining to defining a network, and defining log gathering procedures based on the network configuration information. The method involves locating a second configuration file including security module information pertaining to a security module, and defining a test case based on the security module information, the test case including a test data package. The method involves parsing data from the first and second configuration files to generate a data object. The method involves activating the security module to produce a vulnerability output. The method involves executing within the security module the test data package and the test case to identify a penetration vulnerability associated with the vulnerability output of the network. The method involves outputting the penetration vulnerability of the network.

22 Claims, 11 Drawing Sheets

(56) References Cited

U.S. PATENT DOCUMENTS

| | | | | |
|---|---|---|---|---|
| 10,880,326 | B1 * | 12/2020 | Gofman | H04L 51/08 |
| 11,582,256 | B2 * | 2/2023 | Moskovich | H04L 63/20 |
| 2004/0260818 | A1 * | 12/2004 | Valois | H04L 63/101 |
| | | | | 709/229 |
| 2015/0237063 | A1 * | 8/2015 | Cotton | H04L 63/1433 |
| | | | | 726/25 |
| 2018/0013657 | A1 * | 1/2018 | Cantwell | H04L 43/08 |
| 2019/0182286 | A1 * | 6/2019 | Zini | H04L 63/1416 |
| 2019/0245883 | A1 * | 8/2019 | Gorodissky | H04L 63/1433 |
| 2020/0265144 | A1 | 8/2020 | Gwilliams | |
| 2021/0144548 | A1 * | 5/2021 | Ben Henda | H04W 12/106 |
| 2022/0377095 | A1 * | 11/2022 | Lee | G06F 18/22 |
| 2023/0229787 | A1 * | 7/2023 | Mahdavipour | H04L 63/1433 |
| | | | | 726/25 |

FOREIGN PATENT DOCUMENTS

| | | | | | |
|---|---|---|---|---|---|
| CN | 110730193 | A | * | 1/2020 | H04L 63/1441 |
| CN | 112511512 | A | * | 3/2021 | |
| CN | 112637873 | A | | 4/2021 | |
| CN | 113454621 | A | * | 9/2021 | G06F 16/955 |
| CN | 114462048 | A | | 5/2022 | |
| CN | 114465743 | A | * | 5/2022 | H04L 63/1408 |
| CN | 116566674 | A | * | 8/2023 | |
| CN | 117118820 | A | * | 11/2023 | H04L 41/069 |
| CN | 117155597 | A | * | 12/2023 | |
| CN | 117498924 | A | * | 2/2024 | H04B 7/18519 |
| CN | 117834633 | A | * | 4/2024 | |
| CN | 118075024 | A | * | 5/2024 | |
| WO | WO-0208853 | A2 | * | 1/2002 | H04L 61/35 |
| WO | WO-2015139724 | A1 | * | 9/2015 | H04L 41/0893 |
| WO | WO-2022049895 | A1 | * | 3/2022 | H04L 63/1416 |
| WO | WO-2023235408 | A1 | * | 12/2023 | G06F 21/554 |

OTHER PUBLICATIONS

The extended European Search Report issued on Nov. 3, 2025, by the European Patent Office in corresponding European Application No. 23832113.7. (9 pages).

* cited by examiner

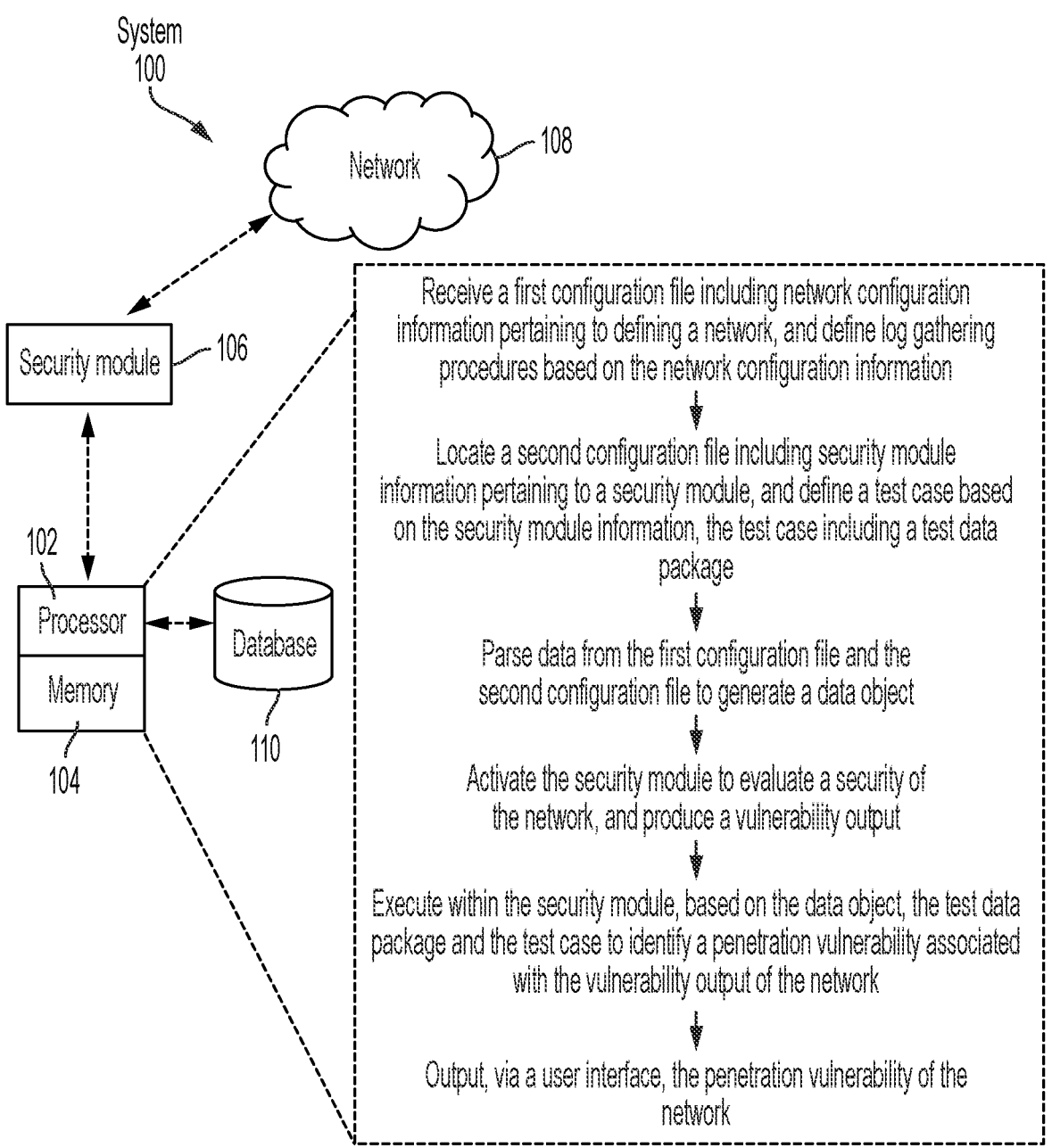

System
100

Network ──108

Security module ──106

102

Processor ↔ Database

Memory

104

110

Receive a first configuration file including network configuration information pertaining to defining a network, and define log gathering procedures based on the network configuration information Locate a second configuration file including security module information pertaining to a security module, and define a test case based on the security module information, the test case including a test data package Parse data from the first configuration file and the second configuration file to generate a data object Activate the security module to evaluate a security of the network, and produce a vulnerability output Execute within the security module, based on the data object, the test data package and the test case to identify a penetration vulnerability associated with the vulnerability output of the network Output, via a user interface, the penetration vulnerability of the network

FIG. 1

SYSTEM AND METHOD FOR NETWORK PENETRATION TESTING

CROSS-REFERENCE TO RELATED APPLICATIONS

This patent application is related to and claims the benefit of priority of U.S. provisional patent application No. 63/357, 052, filed on Jun. 30, 2022, the entire contents of which is incorporated by reference.

FIELD

Embodiments relate to systems and methods for network penetration testing and evaluation.

BACKGROUND INFORMATION

Known systems and methods for network penetration testing and evaluation typically require large computational resources, fail to effectively correlate penetration vulnerability to a network function inside a core network of the network, and may not facilitate access to security modules for operating on the network via a single access point due to disparate languages used for each security module.

SUMMARY

Embodiments relate to a system for network penetration testing. The system can include a processor. The system can include a computer memory having instructions stored thereon that when executed will cause the processor to execute functions. The instruction can cause the processor to receive a first configuration file including network configuration information pertaining to defining a network, and define log gathering procedures based on the network configuration information. The instruction can cause the processor to locate a second configuration file including security module information pertaining to a security module, and define a test case based on the security module information, the test case including a test data package. The instruction can cause the processor to parse data from the first configuration file and the second configuration file to generate a data object. The instruction can cause the processor to activate the security module to evaluate a security of the network, and produce a vulnerability output. The instruction can cause the processor to execute within the security module, based on the data object, the test data package and the test case to identify a penetration vulnerability associated with the vulnerability output of the network. The instruction can cause the processor to output, via a user interface, the penetration vulnerability of the network.

Embodiments relate to a method for penetration testing a network. The method can involve using a configuration file to treat a security module as an operating module that is external to a system executing the method by defining a data object from the configuration file. The method can involve activating the security module. The method can involve executing, based on the data object, a test data package and a test case to identify a penetration vulnerability of the network.

Embodiments relate to a method for penetration testing a network. The method can involve receiving a first configuration file including network configuration information pertaining to defining a network, and defining log gathering procedures based on the network configuration information. The method can involve locating a second configuration file including security module information pertaining to a security module, and defining a test case based on the security module information, the test case including a test data package. The method can involve parsing data from the first configuration file and the second configuration file to generate a data object. The method can involve activating the security module to evaluate a security of the network, and produce a vulnerability output. The method can involve executing within the security module, based on the data object, the test data package and the test case to identify a penetration vulnerability associated with the vulnerability output of the network. The method can involve outputting, via a user interface, the penetration vulnerability of the network.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 1 shows an exemplary system flow diagram;

DETAILED DESCRIPTION

Figure 2:
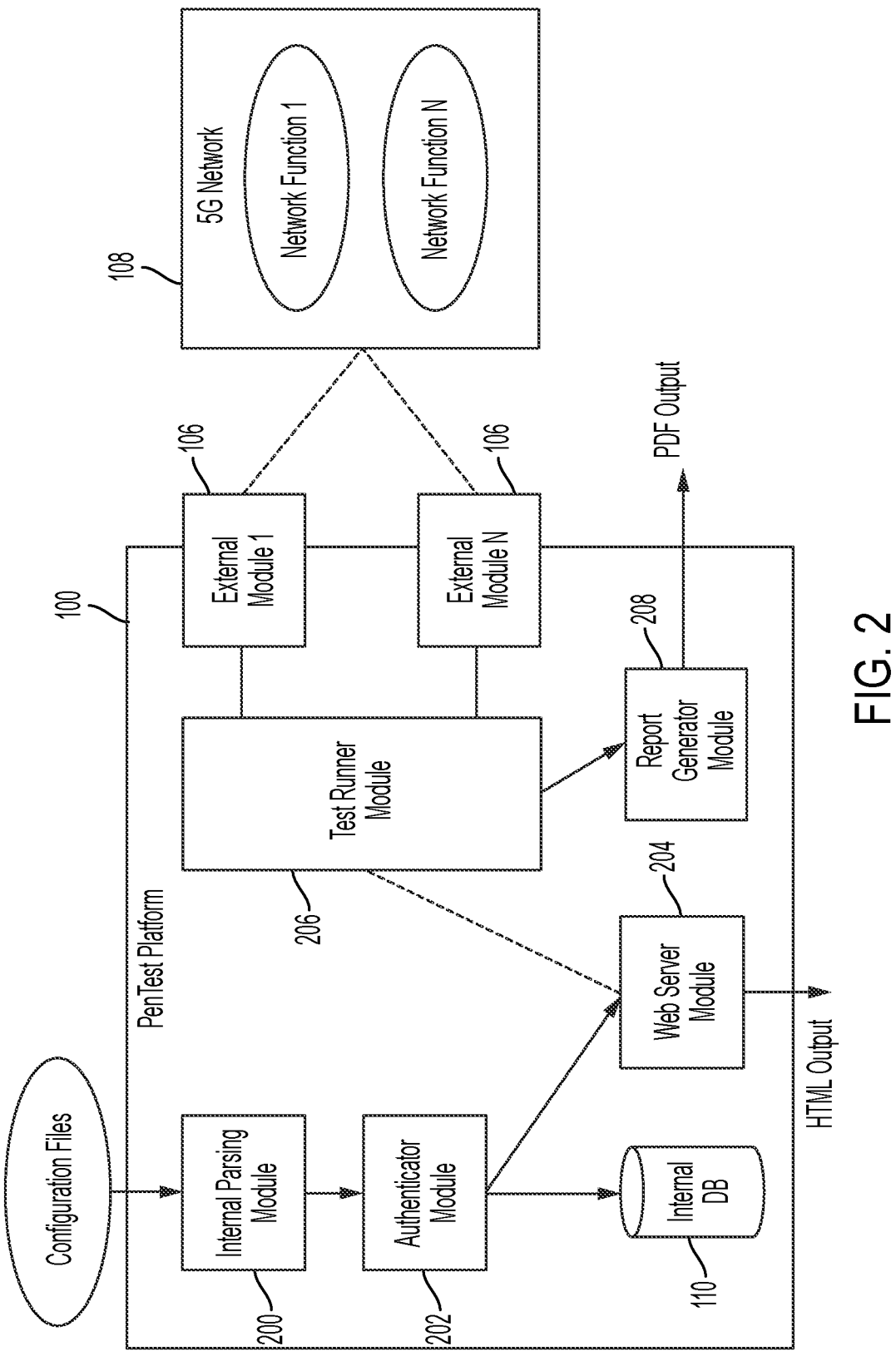
FIG. 2 shows an exemplary system architecture diagram.

Referring to FIGS. 1-2, embodiments can relate to a system 100 for network penetration testing. The system 100 can include a processor 102. The system 100 can include memory 104, which can include computer memory. The memory 104 can be associated with the processor 102. The memory 104 can have instructions stored thereon that when executed will cause the processor 102 to execute at least one function (e.g., algorithmic steps for implementing any of the methods or method steps disclosed herein).

The processor 102 can be any of the processors 102 disclosed herein. The processor 102 can be part of or in communication with a machine (e.g., a computer device, a logic device, a circuit, an operating module (hardware, software, and/or firmware), etc.). The processor 102 can be hardware (e.g., processor, integrated circuit, central processing unit, microprocessor, core processor, computer device, etc.), firmware, software, etc. configured to perform operations by execution of instructions embodied in algorithms, data processing program logic, artificial intelligence programming, automated reasoning programming, etc. It should be noted that use of processors 102 herein can include any one or combination of a Graphics Processing Unit (GPU), a Field Programmable Gate Array (FPGA), a Central Processing Unit (CPU), etc. The processor 102 can include one or more processing or operating modules. A processing or operating module can be a software or firmware operating module configured to implement any of the method steps disclosed herein. The processing or operating module can be embodied as software and stored in memory, the memory being operatively associated with the processor 102. A processing module can be embodied as a web application, a desktop application, a console application, etc.

The processor 102 can include or be associated with a computer or machine readable medium. The computer or machine readable medium can include memory 104. Any of the memory 104 discussed herein can be computer readable memory configured to store data. The memory 104 can include a volatile or non-volatile, transitory or non-transitory memory, and be embodied as an in-memory, an active memory, a cloud memory, etc. Embodiments of the memory 104 can include a processor module and other circuitry to allow for the transfer of data to and from the memory 104, which can include to and from other components of a communication system. This transfer can be via hardwire or wireless transmission. The communication system can include transceivers, which can be used in combination with switches, receivers, transmitters, routers, gateways, waveguides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc.

The computer or machine readable medium can be configured to store one or more instructions thereon. The instructions can be in the form of algorithms, program logic, etc. that cause the processor 102 to execute any of the method steps disclosed herein.

The processor 102 can be in communication with other processors of other devices (e.g., a computer device, a computer system, a laptop computer, a desktop computer, etc.). Any of those other devices can include any of the exemplary processors disclosed herein. Any of the processors can have transceivers or other communication devices/ circuitry to facilitate transmission and reception of wireless signals. Any of the processors can include an Application Programming Interface (API) as a software intermediary that allows two or more applications to talk to each other. Use of an API can allow software of the processor 102 of the system 100 to communicate with software of the processor of the other device(s), if the processor 102 of the system 100 is not the same processor of the device.

The instructions, in combination with the processor 102 and memory 104, can form a framework or a toolkit for testing and evaluating penetration vulnerabilities of a network 108. The instructions can be in the form of software and configured to include a repository/JAR that runs on Ubuntu image, for example. As will be explained herein, the framework can be configured to activate one or more security modules 106. Any one or combination of the security modules 106 can be used to evaluate a security of the network 108. This evaluation can be used to produce a vulnerability output. The framework can also execute, within the security module 106, a test data package and a test case to identify a penetration vulnerability associated with the vulnerability output of the network 108. The framework can be further configured to operate on configuration files so as to reduce computational resources that would otherwise be needed to perform such penetration vulnerability analyses, correlate a penetration vulnerability to a network function inside a core network of the network 108, and facilitate access to any security module for operating on the network 108 via a single access point regardless of disparate languages used by each security module 106. Use of the first and second configuration files facilities seeding the framework with information pertaining to the network 108 to be scanned (e.g., scanned via the security module 106). This information can include IP addresses of Virtual Network Functions (VNFs), vulnerability specific information (e.g., descriptions of vulnerabilities the framework may discover), etc. The framework can be installed on an operating system using a bash script, for example. The bash script can perform the necessary install checks for the security modules 106. Details of how the framework can perform these functions and accomplishes these performance objectives will be discussed next.

The instructions can cause the processor 102 to receive a first configuration file. The first configuration file can include network configuration information pertaining to defining the network 108. It is understood that instructions can cause the processor 102 to receive any number of first configuration files. The instructions can cause the processor 102 to define log gathering procedures based on the network configuration information of any one or combination of first configuration files.

The instructions can cause the processor 102 to locate a second configuration file including security module information pertaining to a security module 106. It is contemplated for there to be at least one second configuration file entry for each security module 106. There can be any number of second configuration file entries for any number of security modules 106. Exemplary security modules 106 can include RNG analyzer, 5G-AKA key material extraction, 3GPP Optional Parameters, etc. The method can involve defining a test case based on the security module information. Defining a test case can be done automatically (e.g., the instructions can cause the processor 102 to define a test case based on the security module information) or manually (e.g., a user can select or define a test case). The test case can be configured as an offensive test case, defensive test case, or any combination thereof. The test case can include a test data package. For instance, a test data package can be defined by the definition or selection of one or more test cases—e.g., a test data package can be a subset of tests and their results, parameters, logs, etc. As can be appreciated, the first configuration file can provide the ability to specify specific log gathering procedures to perform in-between test cases and test data packages. For instance, the first configuration file can have placeholders for unique entries. In an exemplary embodiment, there can be four placeholders: Before Packages, Before Test Cases, After Test Cases, and After Packages. With these parameters, a user can specify specific files/programs/scripts to capture log. A snapshot comparison can be used to allow the user to visually inspect for any potential modifications, alarms, logs, etc. generated on the system. "In-between" test cases and test data packages involves execution of these files at the start and end of each test case as well as test data package.

The instructions can cause the processor 102 to parse data from the first configuration file and the second configuration file to generate a data object. Creation of the data object can associate the security module 106 with the parsed data of the configuration files. The data object can allow the system 100 to execute test data package and the test case within the security module 106 so as to test for and identify a penetration vulnerability of the network 108.

The instructions can cause the processor 102 to activate the security module 106 to evaluate a security of the network 108. This can cause the security module to produce a vulnerability output. For instance, after activation of the security module 106, instructions can cause the processor 102 to listen on a communication port of the network 108 for a specific protocol. Upon receiving a message on this protocol, the instructions can cause the processor 102 to generate an alert pertaining to an incoming response. The instructions can cause the processor 102 to generate a user interface 800 including a command line interface to provide interactive communication with the security module 106. Activation of the security module 106 can be manual (a user can activate a security module 106 via the user interface 800) or automatic (the instructions can cause the processor 102 to automatically activate the security module 106)— a user has the discretion to decide how interactive to be. For automatic activation, program logic, artificial intelligence, etc. can be used to determine which security module 106 will be activated and when it will be activated.

The instructions can cause the processor 102 to execute within the security module 106, based on the data object, the test data package and the test case to identify a penetration vulnerability associated with the vulnerability output of the network 108. Execution of the test data package and the test case can be manual (a user can execute via the user interface 800) or automatic (the instructions can cause the processor 102 to execute)—a user has the discretion to decide how interactive to be. For automatic activation, program logic, artificial intelligence, etc. can be used to determine which test data package and the test case will be activated and when they will be activated.

Figure 8:
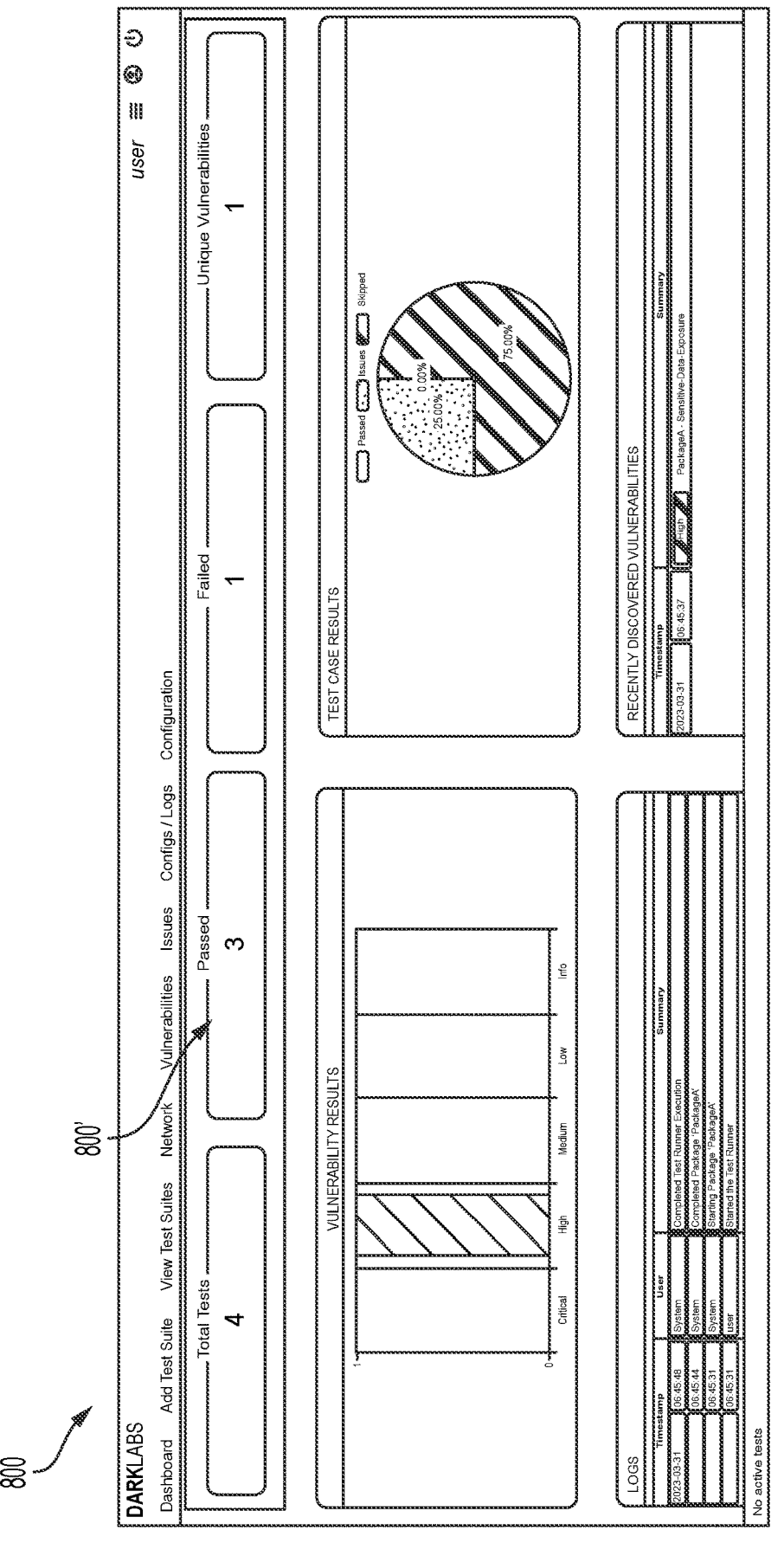
FIG. 8 shows an exemplary dashboard user interface.
Figure 9A:
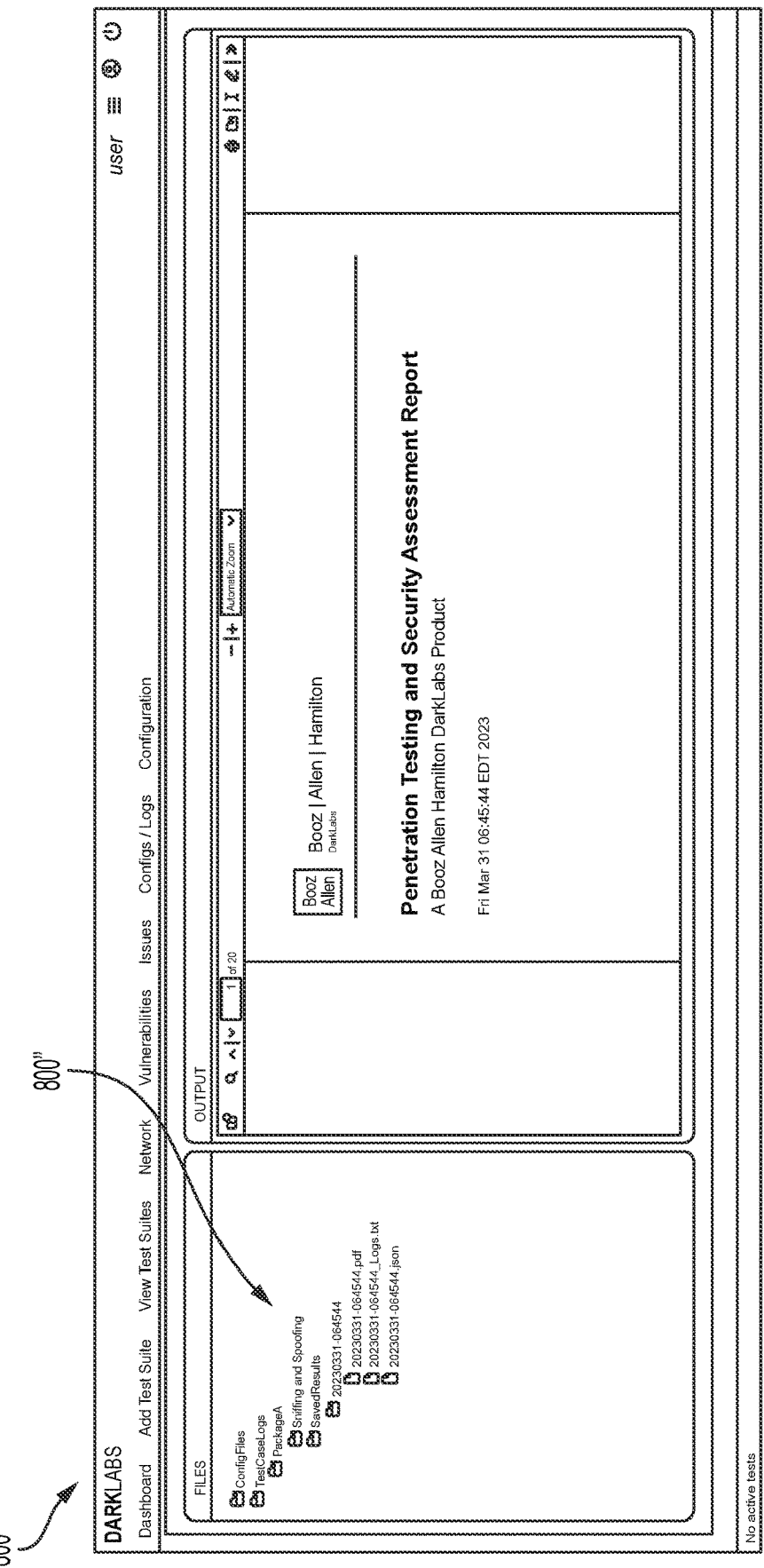
FIGS. 9A, 9B, and 9C show an exemplary folder navigation display user interface.
Figure 9B:
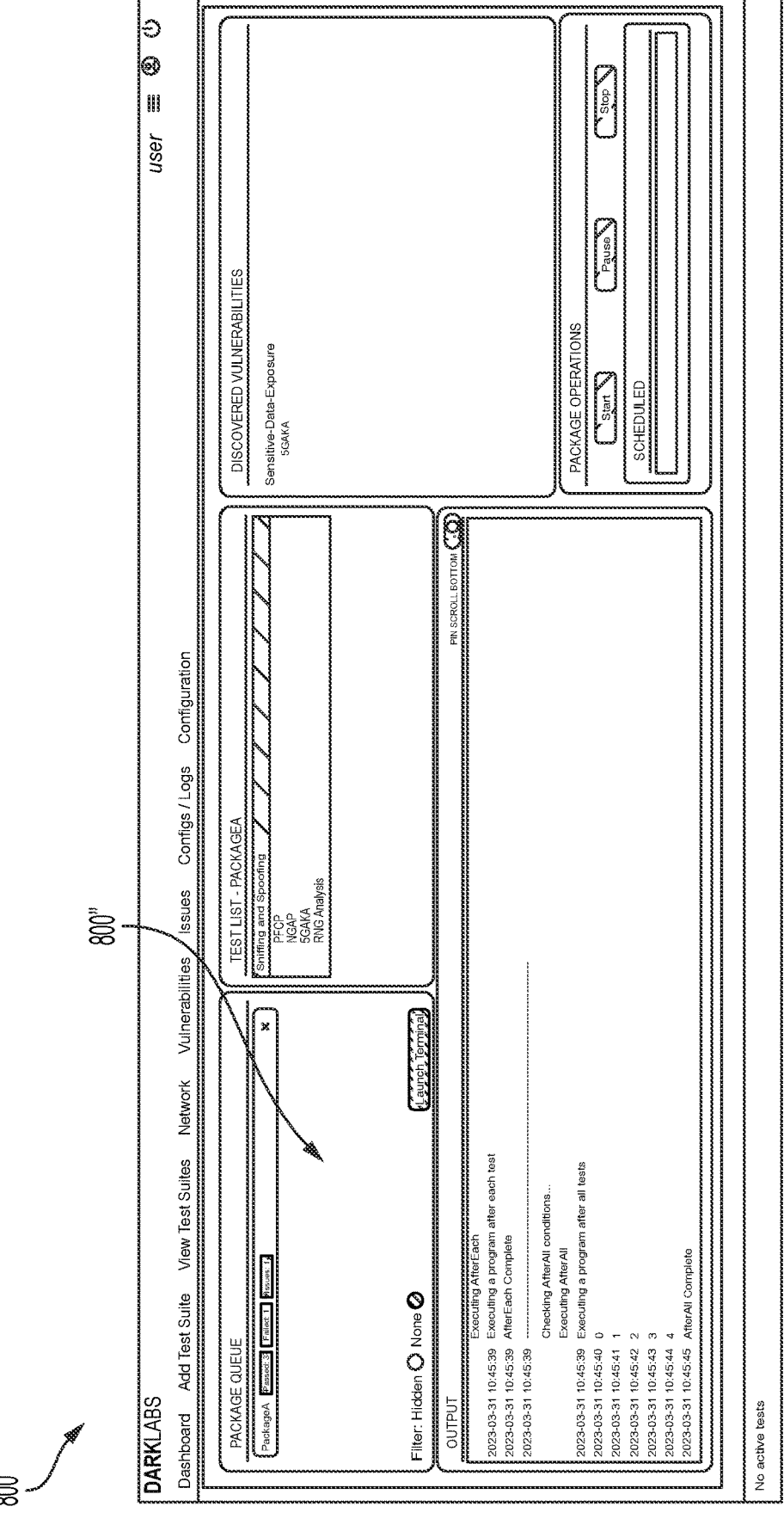

The instructions can cause the processor 102 to output, via a user interface 800, the penetration vulnerability of the network 108. As noted above, the user interface 800 can not only be used to output the penetration vulnerability of the network 108, but it can allow a user to exercise command and control of the system. For instance, the user interface 800 can be displayed via a display (e.g., screen, monitor, etc.) peripheral of the processor 102 or display peripheral of another processor in communication with the processor 102 to provide user interaction with the system 100. Thus, a single user interface can be used to exercise multiple vulnerability and security evaluations against the network 108, as well as evaluate the same. Exemplary user interface 800 displays can be appreciated from FIGS. 8 and 9A-9C. The user interface 800 can include a dashboard display 800' (see FIG. 8). The dashboard display 800' can be configured to provide a health status of the network 108. This can include providing health status constantly, periodically, etc. The health status can include relevant information pertaining to discovered vulnerabilities, how recently they were discovered in real-time, etc. In addition, or in the alternative, the user interface 800 can include a folder navigation display 800" (see FIGS. 9A, 9B and 9C). The system 100 can monitor directories for files created by the security module 106, and these files can be displayed via the folder navigation display 800" to allow a user to view various security module output.

Figure 9C:
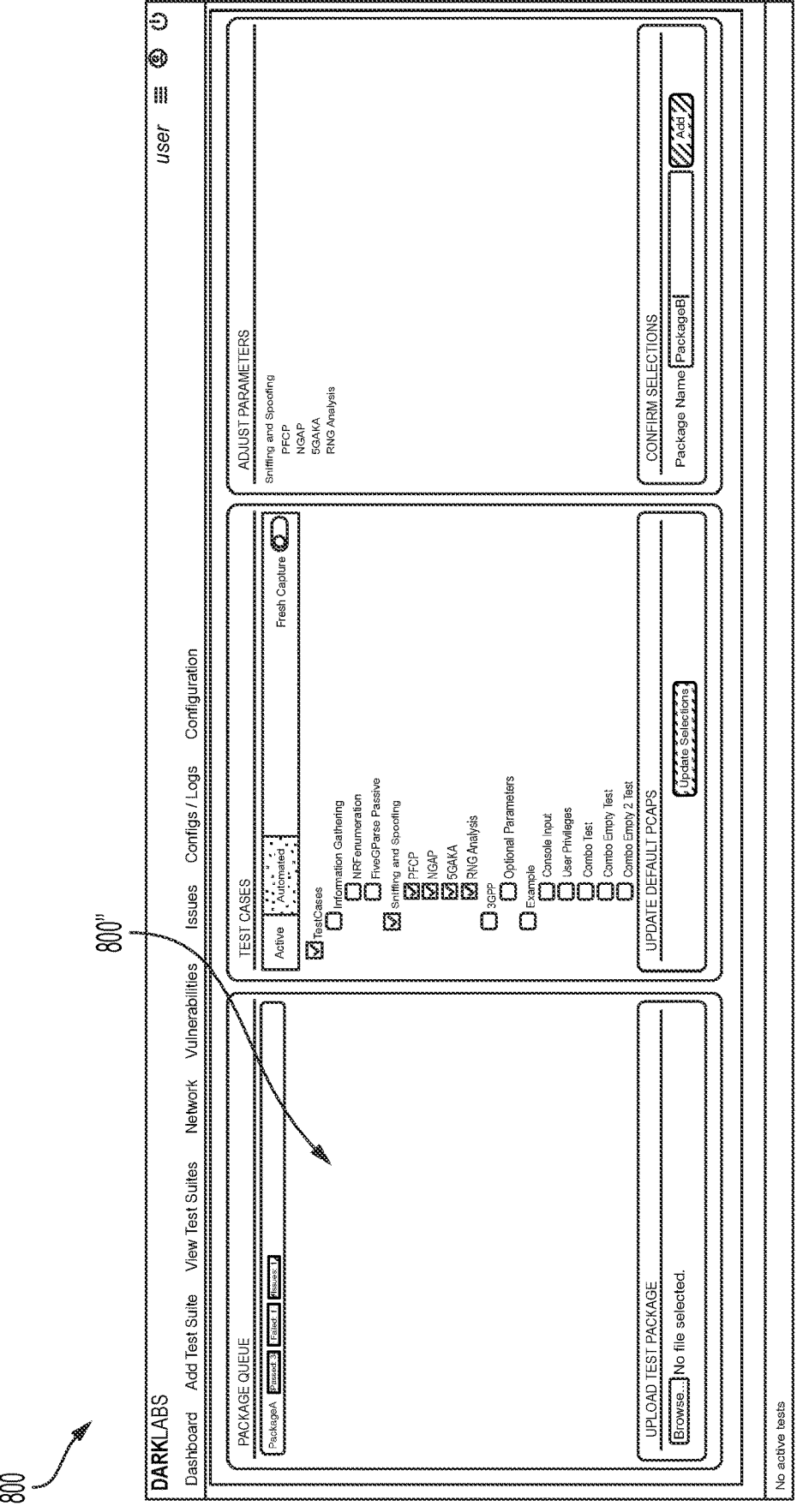

As seen in FIG. 9C, tests can be set as 'Active' or 'Automated'. FIG. 9C shows a center pane having two tabs. Each of these tabs can organize the test cases by that categorization. With that categorization comes the following logic. An 'Active' test allows the user to create a new pcap capture. The user can also use a toggle button allowing for an interactive session. Setting the interactive toggle can clear the list of test cases. This can be due to automated tests not allowing for an interactive session. When switching to 'Automated' the toggle can be updated to indicate 'Fresh Capture'. This means that at the start of the tests the system can require the user to create the new pcap capture. All of this can be built into the tool. The tool can perform the pcap capture of all data it receives and then use those files as parameters for any tools requesting a specific input. The tool can also parse each test case and inform the user of the tasks they should perform in order to have the correct data required for each test. The tool can still allow for the combination of 'Active' and 'Automated' test cases in a given package. However, it may prevent the 'Interactive' toggle set with an automated test.

As noted herein, the processor 102 can include at least one processing or operating module. For instance, the processor 102 can include any one or combination of an authenticator module 202, a server module 204, a test runner module 206, and a report generator module 208. It is understood that while exemplary embodiments may describe and illustrate the processor 102 having one authenticator module 202, one server module 204, one test runner module 206, and one report generator module 208, the processor 102 can have any number of any one or combination of these modules.

The authenticator module 202 can be configured to receive the first configuration file, locate the second configuration file, and parse data from the first configuration file and the second configuration files. Some embodiments can include a separate and distinct data parsing module 200 to perform the data parsing. In some embodiments, the instructions can cause the processor 102 to transmit the data object created by the authenticator module 202 to memory (e.g., a data store, a database 110, etc.). Again, the data object can associate the security module 106 with the parsed data of the configuration files. With the data object stored in a database 110, the system 100 can use the data object to execute test data package and the test case within the security module 106 so as to test for and identify a penetration vulnerability of the network 108.

The system 100 can be configured such that, upon startup, instructions cause the processor 102 to initiate the authenticator module 202. The authenticator module 202 can receive or locate the first configuration file pertaining to information defining the network. This configuration file can contain the IP addresses of VNFs, specific before and after scripts to execute, etc. It is contemplated for the first configuration file to be potentially updated as the scanned network changes. The authenticator module 202 can be configured to use a schema to validate the first configuration file. This can be done to ensure that specific tags appear in a specific order, ensure the correct fields and values are presented, etc. This can be accomplished using an external library that validates xml files. The authenticator module 202 can be configured to generate an output related to an error for any unrecognized fields, wherein the authenticator module 202 can then halt the booting process. If the authenticator module 202 does not detect any errors, it can read in the values from the first configuration file into specific data objects to be used by the framework. The data objects can be processes immediately, stored in memory 104 for later processing, or sent to the database 110 for storage and later processing. Sending the data objects can be via a push (e.g., the processor 102 pushes the data objects) or pull operation (e.g., the memory 104 or database 110 pull the data objects).

Below is an exemplary Config.xml file a user can modify to add any specific information such as IP addresses and before/after script files to execute.

```
<? xml version="1.0" encoding="utf-8" ?>
<SecurityAssessmentSetup>
    <AfterAll>../Data/python/afterAll.py</AfterAll>
```

-continued

```
<AfterEach>../Data/python/afterEach.py</AfterEach>
<BeforeAll></BeforeAll>
<BeforeEach></BeforeEach>
<VNF>
    <AF>10.1.1.1</AF>
    <AMF>10.1.1.2</AMF>
    <AMF>10.1.1.3</AMF>
    <AUSF>10.1.1.4</AUSF>
    <AUSF>10.1.1.31</AUSF>
    <NEF>10.1.1.5</NEF>
    <NRF>10.1.1.6</NRF>
    <NSSAAF>10.1.1.7</NSSAAF>
    <NSACF>10.1.1.16</NSACF>
    <NSSF>10.1.1.8</NSSF>
```

-continued

```
        <PCF>10.1.1.9</PCF>
        <SCP>10.1.1.10</SCP>
        <SMF>10.1.1.11</SMF>
        <SMF>10.1.1.12</SMF>
        <UDM>10.1.1.13</UDM>
        <UPF>10.1.1.14</UPF>
        <UPF>10.1.1.15</UPF>
    </VNF>
</Security AssessmentSetup>
```

Below is an exemplary ConfigSchema.xml file that can be used to validate the config file that defines which tags are allowed and what types of fields are expected.

```
<? xml version="1.0" encoding="utf-8" ?>
<xs:schema xmlns:xs="http://www.w3.org/2001/XMLSchema"
    <!--definition of simple elements -->
    <xs:element name="BeforeAll" type="xs:string"/>
    <xs:element name="BeforeEach" type="xs:string"/>
    <xs:element name="AfterAll" type="xs:string"/>
    <xs:element name="AfterEach" type="xs:string"/>
    <!--adding additional VNFs below should be reflected in ConfigObject, VNF enum-->
    <xs:element type="IPv4Address" name="AF"/>
    <xs:element type="IPv4Address" name="AMF"/>
    <xs:element type="IPv4Address" name="AUSF"/>
    <xs:element type="IPv4Address" name="NEF"/>
    <xs:element type="IPv4Address" name="NRF"/>
    <xs:element type="IPv4Address" name="NSSAAF"/>
    <xs:element type="IPv4Address" name="NSACF"/>
    <xs:element type="IPv4Address" name="NSSF"/>
    <xs:element type="IPv4Address" name="PCF"/>
    <xs:element type="IPv4Address" name="SCP"/>
    <xs:element type="IPv4Address" name="SMF"/>
    <xs:element type="IPv4Address" name="UDM"/>
    <xs:element type="IPv4Address" name="UPF"/>
    <!--definition of simple Types -->
    <xs:simpleType name="IPv4Address">
        <xs:restriction base="xs:string">
            <xs:pattern value="((1?[0-9]?[0-9]|2[0-4][0-9]|25[0-5])\.){3}(1?[0-9]?[0-9]|2[0-
4][0-9]|25[0-5])" />
        </xs:restriction>
    </xs:simpleType>
    <!--definition of complex elements -->
    <xs:element name="VNF">
        <xs:complexType>
            <xs:sequence>
                <xs:element maxOccurs="unbounded" ref="AF"/>
                <xs:element maxOccurs="unbounded" ref="AMF"/>
                <xs:element maxOccurs="unbounded" ref="AUSF"/>
                <xs:element maxOccurs="unbounded" ref="NEF"/>
                <xs:element maxOccurs="unbounded" ref="NRF"/>
                <xs:element maxOccurs="unbounded" ref="NSSAAF"/>
                <xs:element maxOccurs="unbounded" ref="NSACF"/>
                <xs:element maxOccurs="unbounded" ref="NSSF"/>
                <xs:element maxOccurs="unbounded" ref="PCF"/>
                <xs:element maxOccurs="unbounded" ref="SCP"/>
                <xs:element maxOccurs="unbounded" ref="SMF">
                <xs:element maxOccurs="unbounded" ref="UDM"/>
                <xs:element maxOccurs="unbounded" ref="UPF"/>
            </xs:sequence>
        </xs:complexType>
    </xs:element>
    <xs:element name="SecurityAssessmentSetup">
        <xs:complexType>
            <xs:sequence>
                <xs:element ref="AfterAll"/>
                <xs:element ref="AfterEach"/>
                <xs:element ref="BeforeAll"/>
                <xs:element ref="BeforeEach"/>
                <xs:element ref="VNF"/>
            </xs:sequence>
        </xs:complexType>
    </xs:element>
</xs:schema>
```

The authenticator module 202 can receive or locate the second configuration file. It is contemplated for the second configuration file to be updated only by developers. The second configuration file can contain information pertaining to the security module 106. This can include descriptions, paths, variables, etc. used by the security module 106, information pertaining to vulnerabilities the security module 106 is scanning against, etc. The authenticator module 202 can compare the second configuration file against a separate schema file. The second configuration file can be validated utilizing the same or similar logic as described above for the first configuration file.

Below is an exemplary DictionaryConfig.xml file that can be used by a user to specify everything pertaining to tests such as external modules, vulnerabilities, VNF descriptions, etc.

```xml
<? xml version="1.0" encoding="utf-8" standalone="no"?>
<TestCaseInfo>
  <DefaultCreds>
    <Credentials Password="admin" UserName="admin" Vendor="Nokia"/>
    <Credentials Password="admin" UserName="sysadmin" Vendor-"Nokia"/>
    <Credentials Password="admin" UserName="Nokia" Vendor="Nokia"/>
    <Credentials Password="ADMIN" UserName="ADMIN" Vendor="Alcatel"/>
  </DefaultCreds>
  <Diagrams>
    <Diagram FileName="Test" Path=""/>
  </Diagrams>
  <TestCases>
    <TestCase Group="Information Gathering" TestName="5GMap" VNF="System">
      <File>../Data/python/fiveGMain.py</File>
      <Description>Maps the 5G network through analysis of a message
capture</Description>
      <AssociatedVulnerabilities>Authentication</AssociatedVulnerabilities>
      <Items Command="--nd" ParamName="Network Discovery" Required="false"
Type="Empty" Value=""/>
      <Items Command="-s" FileType="" ParamName="Pcap Folder" Required="true"
Type="FolderChooser" Value="../Data/PCAP-5GMap/"/>
      <Items Command="-d" Monitor="" ParamName="Output Directory"
Required="true" Type="Logs" Value=""/>
      <Items Command="--ml" FileType="pkl" ParamName="Machine Learning Pickle"
Required="false" Type="FileChooser" Value="../Data/python/fiveg-
main/fiveg/Nokia_5G_ip_to_vnf_decision_tree_classifier.pkl"/>
    </TestCase>
    <TestCase Group="Sniffing and Spoofing" TestName="PFCP" VNF="UPF AMF">
      <File> ./Data/python/pfcpParser.py</File>
      <Description>Identifies security threats impacting user-plane traffic in a 5G system
</Description>
      <Associated Vulnerabilities>Authentication Encryption
Security</Associated Vulnerabilities>
      <Items Command="-M" ParamName="Mode" Required="true" Type="Integer"
Value="1"/>
      <Items Command="-s" FileType="pcap" ParamName="PCAP File" Required="true"
Type="FileChooser" Value="../Data/TestData/source"/>
      <Items Command="-o" ParamName="Output Filename" Required="true"
Type="String" Value="output"/>
      <Items Command="-d" Monitor-"" ParamName="Output Directory"
Required="true" Type="Logs" Value=""/>
    </TestCase>
    <TestCase Group="Sniffing and Spoofing" TestName="5GAKA" VNF="UPF">
      <File>../Data/python/fiveg_aka.py</File>
      <Description>Validates security of the 5GAKA authentication protocol by extracting
and analyzing derivative key material in the 5G-AKA Registration Procedure from static PCAP
file taken from the AMF, AUSF, and UDM in the 5G Core Service-Based
Architecture</Description>
      <AssociatedVulnerabilities>Encryption Authentication</AssociatedVulnerabilities>
      <Items Command="-i" FileType="pcap" ParamName="Pcap File" Required="true"
Type="FileChooser" Value="../Data/TestData/source"/>
      <Items Command="-d" Monitor="" ParamName="Output Directory"
Required="true" Type="Logs" Value=""/>
      <Items Command="-o" ParamName="Output File Name" Required="true"
Type="String" Value="5gAKA"/>
      <Items Command="-m" ParamName="Metadata File" Required="false"
Type="Boolean" Value="true"/>
    </TestCase>
    <TestCase Group="Sniffing and Spoofing" TestName="RNG Analysis"
VNF="System">
      <File>../Data/python/NIST_SP800-22_code/sts-2.1.2/rng_analysis.py</File>
      <Description>Validates the systems RNG during authentication</Description>
      <Associated Vulnerabilities>Authentication Security</Associated Vulnerabilities>
      <Items Command="-f" FileType="csv" ParamName="CSV File" Required="true"
TestCreatedFile="true" Type="FileChooser" Value="TestData/Sniffing and
Spoofing/5GAKA/5gAKA"/>
      <Items Command="-o" Monitor="" ParamName="Output Directory"
Required="true" Type="Logs" Value=""/>
      <Items Command="-r" Monitor="" ParamName="Random Number"
Required="false" Type="Integer" Value=""/>
```

```
    </TestCase>
    <TestCase Group="3GPP" TestName="Optional Parameters" VNF="AMF RAN">
        <File>../Data/python/OptionalParameters.py</File>
        <Description>Checks the system against all optional parameters specified by
3GPP</Description>
        <Associated Vulnerabilities>UserData</AssociatedVulnerabilities>
        <Items Command="" FileType="pcap" ParamName="PCAP File 1" Required="true"
Type="FileChooser" Value="../Data/TestData/registration"/>
    </TestCase>
    <TestCase Group="Example" TestName="Console Input" VNF="AMF UPF">
        <File>../Data/python/testInput.py</File>
        <Description>Checks handling of user input requests</Description>
        <Associated Vulnerabilities>UserData</AssociatedVulnerabilities>
    </TestCase>
    <TestCase Group="Example" TestName="User Privileges" VNF="System">
        <File>../Data/python/sampleDelay.py</File>
        <Description>Performs NIST associated testing</Description>
        <Associated Vulnerabilities>SecureData</AssociatedVulnerabilities>
        <Items Command="-d" Monitor="" ParamName="Output Directory"
Required="true" Type="Logs" Value="">
        <Items Command="-f" FileType="pcap" ParamName="Pcap File" Required="true"
Type="FileChooser" Value="../Data/TestData/cmWave_3"/>
    </TestCase>
    <TestCase Group="Example" TestName="Combo Test" VNF="System">
        <File>../Data/python/nist.py</File>
        <Description>Performs NIST associated testing</Description>
        <Associated Vulnerabilities>SecureData</AssociatedVulnerabilities>
        <Items Command="-d" Monitor="" ParamName="Output Directory"
Required="true" Type="Logs" Value=""/>
        <Items Command="-a" Criteria="AUSF" ParamName="AUSF IP" Required="true"
Type="Combo" Value=""/>
        <Items Command="-b" Criteria="UPF" ParamName="UPF IP" Required="true"
Type="List" Value=""/>
    </TestCase>
    <TestCase Group="Example" TestName="Combo Empty Test" VNF="System">
        <File>../Data/python/nist.py</File>
        <Description>Performs NIST associated testing</Description>
        <Associated Vulnerabilities>SecureData</AssociatedVulnerabilities>
        <Items Command="-d" Monitor="" ParamName="Output Directory"
Required="true" Type="Logs" Value=""/>
        <Items Command="-a" Criteria="DN" ParamName="DN IP Combo"
Required="true" Type="Combo" Value=""/>
        <Items Command="-b" Criteria="UPF" ParamName="UPF IP" Required="true"
Type="List" Value="">
        </TestCase>
    <TestCase Group="Example" TestName="Combo Empty 2 Test" VNF="System">
        <File>../Data/python/nist.py</File>
        <Description>Performs NIST associated testing</Description>
        <Associated Vulnerabilities>SecureData</AssociatedVulnerabilities>
        <Items Command="-d" Monitor="" ParamName="Output Directory"
Required="true" Type="Logs" Value=""/>
        <Items Command="-a" Criteria="AUSF" ParamName="AUSF IP" Required="true"
Type="Combo" Value="">
        <Items Command="-b" Criteria="DN" ParamName="DN IP List" Required="true"
Type="List" Value="">
    </TestCase>
    <TestCase Group="Example" TestName="Vulnerability Printer" VNF="System">
        <File>../Data/python/VulnerabilityPrinter.py</File>
        <Description>Performs NIST associated testing</Description>
        <Associated Vulnerabilities>Authentication</AssociatedVulnerabilities>
        <Items Command="-d" Monitor="" ParamName="Output Directory"
Required="true" Type="Logs" Value=""/>
    </TestCase>
    <TestCase Group="Example" TestName="Error Printer" VNF="System">
        <File>../Data/python/ErrorPrinter.py</File>
        <Description>Performs NIST associated testing</Description>
        <Associated Vulnerabilities>Authentication</AssociatedVulnerabilities>
        <Items Command="-d" Monitor="" ParamName="Output Directory"
Required="true" Type="Logs" Value=""/>
    </TestCase>
    </TestCases>
    <VulnerabilityList>
    <Vulnerability DisclosureDate="2017-03-13" DiscoveryDate="" ID="CVE:CVE-
2017-0143" RiskFactor="High" VNF="UPF" VName="SampleError">
        <Description>The system does not utilize proper TLSv1.2 encryption on
traffic</Description>
        <RiskDescription>A critical remote code execution vulnerability exists in Microsoft
SMBv1 servers (ms17-010).</RiskDescription>
```

```
    <Solution/>
    <Reference>https://cve.mitre.org/cgi-bin/cvename.cgi?name=CVE-2017-
0143</Reference>
    <Reference>https://technet.microsoft.com/en-us/library/security/ms17-
010.aspx</Reference>
    <Reference>https://blogs.technet.microsoft.com/msrc/2017/05/12/customer-
guidance-for-wannacrypt-attacks/</Reference>
  </Vulnerability>
  <Vulnerability DisclosureDate="2017-03-14" DiscoveryDate="" ID=""
RiskFactor="High" VNF="UPF" VName="Authentication">
    <Description>The system does not utilize proper authentication
parameters</Description>
    <RiskDescription>A critical remote error</RiskDescription>
    <Solution/>
  </Vulnerability>
  <Vulnerability DisclosureDate="2017-03-14" DiscoveryDate="" ID=""
RiskFactor="High" VNF="UPF" VName="Security">
    <Description>The systems does not utilize a secure RAND algorithm</Description>
    <RiskDescription>A critical remote error</RiskDescription>
    <Solution/>
  </Vulnerability>
  <Vulnerability DisclosureDate="2017-03-14" DiscoveryDate="" ID=""
RiskFactor="High" VNF="System" VName="Encryption">
    <Description>The system does not utilize secure transmission of data across the N4
interface</Description>
    <RiskDescription>A critical remote error</RiskDescription>
    <Solution/>
  </Vulnerability>
  <Vulnerability DisclosureDate="2017-03-14" DiscoveryDate="2022-05-06 12:36:32"
ID="" RiskFactor-"Medium" VNF="UPF" VName="UserData">
    <Description>The system passes the IMSI/IMEI/MSISDN unencrypted across the
network</Description>
    <RiskDescription>A critical remote error</RiskDescription>
    <Solution>No Solution Provided</Solution>
  </Vulnerability>
  <Vulnerability DisclosureDate="2017-03-14" DiscoveryDate="" ID=""
RiskFactor="High" VNF="AMF UPF" VName="SecureData">
    <Description>The system does not hide the SUPI allowing for translation of
SUPI/SUCI</Description>
    <RiskDescription>A critical remote error</RiskDescription>
    <Solution/>
  </Vulnerability>
  <Vulnerability DisclosureDate="2006-07-19" DiscoveryDate="2022-05-02 16:06:22"
ID="CWE-319: Cleartext Transmission of Sensitive Information" RiskFactor="High"
VNF="AMF UDM AUSF" VName="Sensitive-Data-Exposure">
    <Description>Cleartext Transmission of Sensitive Information</Description>
    <RiskDescription>The product exposes sensitive information to an actor that is not
explicitly authorized to have access to that information. Weakness can lead to loss of data
confidentiality that allows unauthorized actor to read application data.</RiskDescription>
    <Solution>Configure servers to use encrypted channels for communication, which
may include TLS or other secure protocols.</Solution>
  </Vulnerability>
  <Vulnerability DisclosureDate="" DiscoveryDate="2022-05-02 15:15:19" ID="CWE-
354: Improper Validation of Integrity Check Value" RiskFactor="High" VNF="AMF RAN"
VName="User-Plane-Confidentiality-Protection">
    <Description>User Plane Confidentiality protection not applied on the PDU
Session</Description>
    <RiskDescription>The software does not validate or incorrectly validates the integrity
check values or "checksums" of a message. This may prevent it from detecting if the data has
been modified or corrupted in transmission.</RiskDescription>
    <Solution>Ensure User Plane Confidentiality Protection set to "Required" or
"Preferred".</Solution>
  </Vulnerability>
  <Vulnerability DisclosureDate="" DiscoveryDate="2022-05-06 12:36:32" ID=""
RiskFactor-"Info" VNF="UPF" VName="InfoTest">
    <Description>Informational Data provided</Description>
    <RiskDescription/>
    <Solution>Change severity levels</Solution>
  </Vulnerability>
  <Vulnerability DisclosureDate="" DiscoveryDate="2022-05-06 12:36:32" ID=""
RiskFactor="Low" VNF="UPF" VName="LowTest">
    <Description>Enhance simple security feature</Description>
    <RiskDescription/>
    <Solution>Enhance User Data security of the SMB server</Solution>
  </Vulnerability>
  <Vulnerability DisclosureDate="" DiscoveryDate="2022-05-06 12:36:32" ID=""
RiskFactor="Medium" VNF="UPF" VName="MediumTest">
    <Description>Medium level issues inside the VNF</Description>
    <RiskDescription/>
```

```
    <Solution>Enhance User Data security of the SMB server</Solution>
</Vulnerability>
<Vulnerability DisclosureDate="" DiscoveryDate="2022-05-06 12:36:32" ID=""
RiskFactor="High" VNF="UPF" VName="HighTest">
    <Description>High chance of potential loss of network reliability</Description>
    <RiskDescription/>
    <Solution>Enhance User Data security of the SMB server</Solution>
        </Vulnerability>
        <Vulnerability DisclosureDate="" DiscoveryDate="2022-05-06 12:36:32" ID=""
RiskFactor="Critical" VNF="UPF" VName-"CriticalTest">
            <Description>Critical error resulting in gathering of secure
information</Description>
            <RiskDescription/>
            <Solution>Enhance User Data security of the SMB server</Solution>
            </Vulnerability>
        </VulnerabilityList>
        <VNFDescriptions>
        <VNF Description="The Application Function is a control plane function within the
5G core network and provides application services to the subscriber." Name="AF"/>
        <VNF Description="The Access and Mobility Function is responsible for handling the
connection and mobility management related information." Name="AMF"/>
            <VNF Description="The Authentication and Session Function is responsible for
handling authentication requests for both, 3GPP access and untrusted non-3GPP access."
Name="AUSF">
            <VNF Description="The Data Network is an external entity to the 5G core."
Name="DN"/>
            <VNF Description="The Network Exposure Function supports secure exposure of
capabilities to the network functions." Name="NEF"/>
            <VNF Description="The Network Repository Function maintains a record of available
NF instances and supported services." Name="NRF"/>
            <VNF Description="The Network Slice Specific Authentication and Authorization
Function supports Network Slice-Specific Authentication and Authorization with a AAA Server
(AAA-S)." Name="NSSAAF"/>
            <VNF Description="The Network Slice Admission Control Function procedures are
performed for an S-NSSAI which is subject to Network Slice Admission Control."
Name="NSACF"/>
            <VNF Description="The Network Slice Selection Function is responsible for
providing the AMF a Network Slice Instance of the requested network slice." Name="NSSF"/>
            <VNF Description="The Policy Control Function interacts with the SMF over the N7
interface during session establishment or modification." Name="PCF"/>
            <VNF Description="The Service Communication Proxy provides a single point of
entry for a cluster of network functions, once they have been successfully discovered by the
NRF." Name="SCP"/>
            <VNF Description="The Session Management Function handles session context
information with the UPF." Name="SMF"/>
            <VNF Description="The Unified Data Management provides services to other SBA
functions, such as the SMF, AMF, and NEF." Name="UDM"/>
            <VNF Description="The User Equipment contains the IP address of a physical phone."
Name="UE"/>
            <VNF Description="The User Plane Function is responsible for routing and
forwarding user plane packets between the Access Node (gNB) and external data network."
Name="UPF"/>
            <VNF Description="System encompasses Test Cases that cover multiple VNFs. This
allows for a single grouping over listing every type." Name="System"/>
        </VNFDescriptions>
    </TestCaseInfo>
```

Below is an exemplary DictionarySchema.xml file that
can be used to validate the DictionaryConfig.

```
<? xml version="1.0" encoding="utf-8" ?>
<xs:schema xmlns:xs="http://www.w3.org/2001/XMLSchema">
    <!--definition of attributes-->
    <xs:attribute name="VName" type="xs:ID"/>
    <xs:attribute name="ID" type="xs:string"/>
    <xs:attribute name="RiskFactor" type="xs:string"/>
    <xs:attribute name="DisclosureDate" type="xs:string"/>
    <xs:attribute name="DiscoveryDate" type="xs:string"/>
    <xs:attribute name="Vendor" type="xs:string"/>
    <xs:attribute name="UserName" type="xs:string"/>
    <xs:attribute name="Password" type="xs:string"/>
    <xs:attribute name="ParamName" type="xs:string"/>
    <xs:attribute name="TestName" type="xs:string"/>
    <xs:attribute name="Value" type="xs:string"/>
    <xs:attribute name="Command" type="xs:string"/>
    <xs:attribute name="FileType" type="xs:string"/>
```

-continued

```
<xs:attribute name="Monitor" type="xs:string"/>
<xs:attribute name="FileName" type="xs:string"/>
<xs:attribute name="Path" type="xs:string"/>
<xs:attribute name="Required" type="xs:boolean"/>
<xs:attribute name="TestCreatedFile" type="xs:boolean"/>
<!--definition of simple elements-->
<xs:element name="File" type="xs:string"/>
<xs:element name="Associated Vulnerabilities" type="valuelist"/>
<xs:element name="Description" type="xs:string"/>
<xs:element name="RiskDescription" type="xs:string"/>
<xs:element name="Reference" type="xs:string"/>
<xs:element name="Solution" type="xs:string"/>
<xs:simpleType name="valuelist">
    <xs:list item Type="xs:IDREF"/> <!-- Link to VName (ensures VName exists) -->
</xs:simpleType>
<!-- Set restriction attributes "|" indicates OR -->
<xs:attribute name="Type">
    <xs:simpleType>
        <xs:restriction base="xs:string">
            <xs:pattern
value="String|Integer|Char|Boolean|Empty|FolderChooser|FileChooser|IP|Combo|List|Logs"/>
        </xs:restriction>
    </xs:simpleType>
</xs:attribute>
<xs:attribute name="Criteria">
    <xs:simpleType>
        <xs:restriction base="xs:string">
            <xs:pattern
value="AF|AMF|AUSF|DN|NEF|NRF|NSSAAF|NSACF|NSSF|PCF|RAN|SCP|SMF|UDM|UE|U
PF"/>
        </xs:restriction>
    </xs:simpleType>
</xs:attribute>
<xs:attribute name="VNF">
    <xs:simpleType>
        <xs:restriction base="xs:string">
        <!-- Limit to 6 unique VNFs. If larger necessary use General -->
            <xs:pattern
value="((AF|AMF|AUSF|DN|NEF|NRF|NSAAF|NSACF|NSSF|PCF|RAN|SCP|SMF|UDM|UE|
UPF|System)[\s]*){1,6}">
        </xs:restriction>
    </xs:simpleType>
</xs:attribute>
<xs:attribute name="Group">
    <xs:simpleType>
        <xs:restriction base="xs:string">
            <xs:pattern value="Information Gathering|Sniffing and
Spoofing|3GPP|NIST|Example"/>
        </xs:restriction>
    </xs:simpleType>
</xs:attribute>
<!--definition of complex elements-->
<xs:element name="Items">
    <xs:complexType>
        <xs:attribute ref="Value" use="required"/>
        <xs:attribute ref="Command" use="required"/>
        <xs:attribute ref="FileType"/>
        <xs:attribute ref="Monitor"/>
        <xs:attribute ref="ParamName" use="required"/>
        <xs:attribute ref="Type" use="required"/>
        <xs:attribute ref="TestCreatedFile"/>
        <xs:attribute ref="Criteria"/>
        <xs:attribute ref="Required" use="required"/>
    </xs:complexType>
</xs:element>
<xs:element name="Credentials">
    <xs:complexType>
        <xs:attribute ref="Vendor" use="required"/>
        <xs:attribute ref="UserName" use="required"/>
        <xs:attribute ref="Password" use="required"/>
    </xs:complexType>
</xs:element>
<xs:element name="DefaultCreds">
    <xs:complexType>
        <xs:sequence>
            <xs:element ref="Credentials" maxOccurs="unbounded"/>
        </xs:sequence>
    </xs:complexType>
</xs:element>
```

-continued

```
<xs:element name="Diagrams">
   <xs:complexType>
      <xs:sequence>
         <xs:element name="Diagram" minOccurs="0"
maxOccurs="unbounded">
            <xs:complexType>
               <xs:attribute ref="FileName" use="required"/>
               <xs:attribute ref="Path" use="required"/>
            </xs:complexType>
         </xs:element>
      </xs:sequence>
   </xs:complexType>
   <xs:unique name="unique-FileName">
      <xs:selector xpath="Diagram"/>
      <xs:field xpath="@FileName"/>
   </xs:unique>
</xs:element>
<xs:element name="TestCase">
   <xs:complexType>
      <xs:sequence>
         <xs:element ref="File"/>
         <xs:element ref="Description"/>
         <xs:element ref="Associated Vulnerabilities"/>
         <xs:element ref="Items" minOccurs="0"
maxOccurs="unbounded"/>
      </xs:sequence>
      <xs:attribute ref="Group" use="required"/>
      <xs:attribute ref="TestName" use="required"/>
      <xs:attribute ref="VNF" use="required"/>
   </xs:complexType>
</xs:element>
<xs:element name="TestCases">
   <xs:complexType>
      <xs:sequence>
         <xs:element ref="TestCase" maxOccurs="unbounded"/>
      </xs:sequence>
   </xs:complexType>
   <xs:unique name="unique-ID">
      <xs:selector xpath="TestCase"/>
      <xs:field xpath="@TestName"/>
   </xs:unique>
</xs:element>
<xs:element name="Vulnerability">
   <xs:complexType>
      <xs:sequence>
         <xs:element ref="Description"/>
         <xs:element ref="RiskDescription"/>
         <xs:element ref="Solution"/>
         <xs:element ref="Reference" minOccurs="0"
maxOccurs="unbounded"/>
      </xs:sequence>
      <xs:attribute ref="VName" use="required"/>
      <xs:attribute ref="VNF" use="required"/>
      <xs:attribute ref="ID"/>
      <xs:attribute ref="RiskFactor" />
      <xs:attribute ref="DisclosureDate"/>
      <xs:attribute ref="DiscoveryDate"/>
   </xs:complexType>
</xs:element>
<xs:element name="VulnerabilityList">
   <xs:complexType>
      <xs:sequence>
         <xs:element name="Vulnerability" maxOccurs="unbounded"/>
      </xs:sequence>
   </xs:complexType>
   <xs:unique name="unique-VName">
      <xs:selector xpath="Vulnerability"/>
      <xs:field xpath="@VName"/>
   </xs:unique>
</xs:element>
<xs:element name="VNFDescriptions">
   <xs:complex Type>
      <xs:sequence>
         <xs:element name="VNF" maxOccurs="unbounded">
            <xs:complexType>
               <xs:attribute name="Name" use="required"/>
               <xs:attribute name="Description" use="required"/>
            </xs:complexType>
         </xs:element>
```

-continued

```
        </xs:sequence>
      </xs:complexType>
    </xs:element>
    <xs:element name="TestCaseInfo">
      <xs:complexType>
        <xs:sequence>
          <xs:element ref="DefaultCreds">
          <xs:element ref="Diagrams"/>
          <xs:element ref="TestCases"/>
          <xs:element ref="VulnerabilityList"/>
          <xs:element ref="VNFDescriptions"/>
        </xs:sequence>
      </xs:complexType>
    </xs:element>
</xs:schema>
```

The authenticator module 202 can also parse the data. This can involve parsing historical data. A third schema file can be used to parse saved data. This can allow the platform to persist over restarts or potential power failures.

Figure 3:
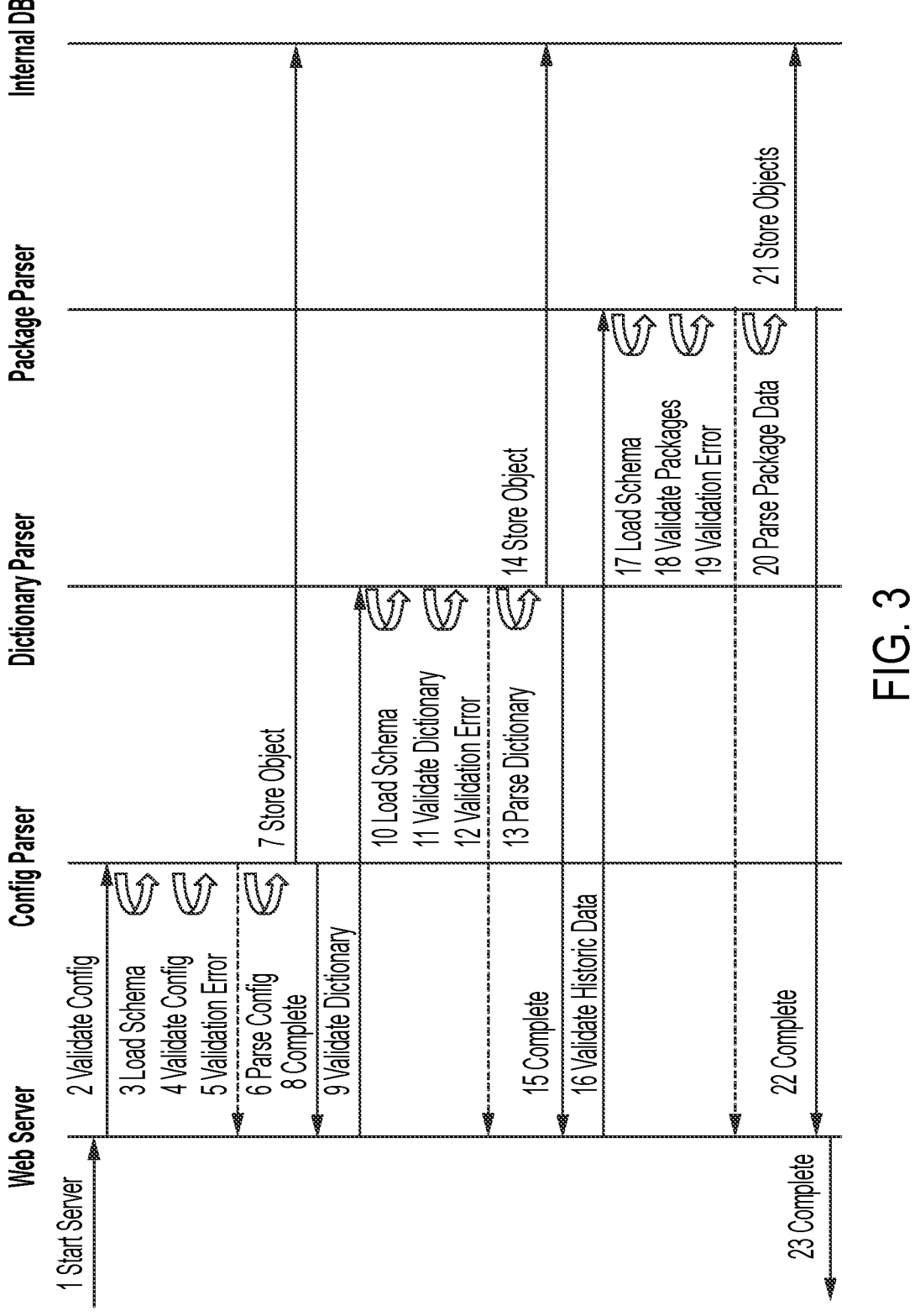
FIG. 3 shows an exemplary authenticator module flow diagram for executing server initiation.
Figure 4:
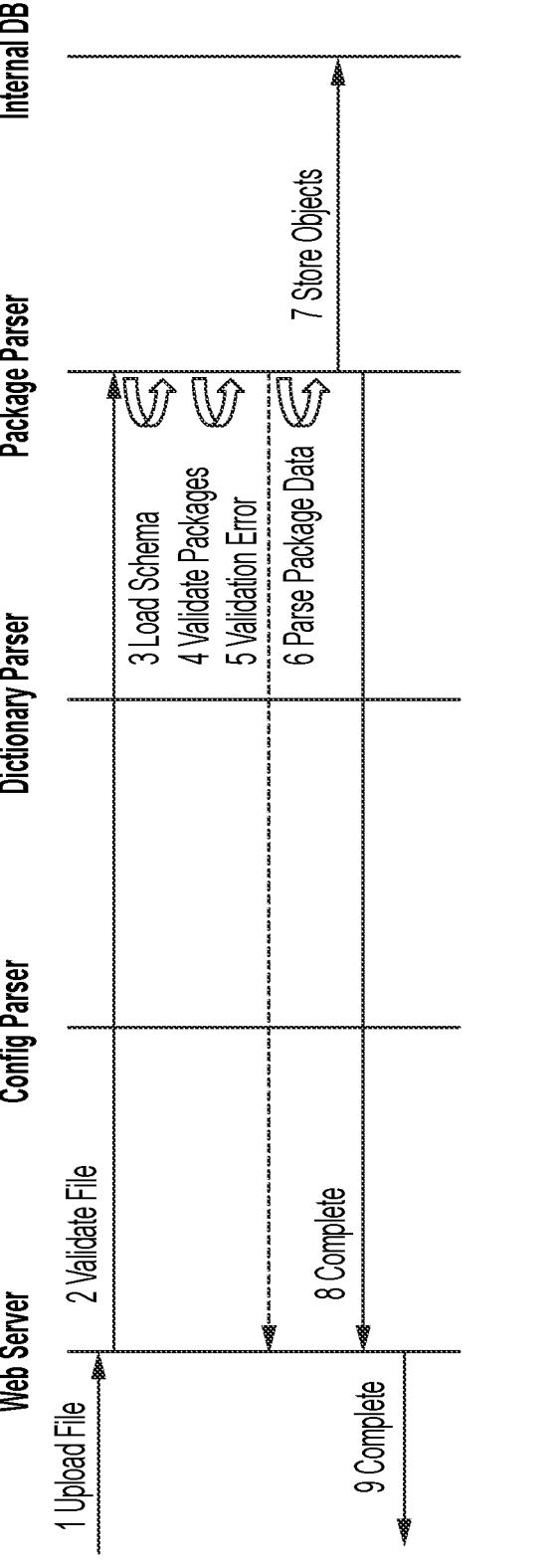
FIG. 4 shows an exemplary authenticator module flow diagram for executing user upload of packets.

Referring to FIGS. 3-4, exemplary authenticator module 202 flow diagrams are shown.

Exemplary process steps that may be carried out by the authenticator module 202 upon server module 204 start include:

1. User selects to start the server module 204.
2. Server module 204 indicates to the Config Parser to start its processing.
3. Config Parser loads the schema for validating the config.
4. Config Parser validates the config.
5. Config Parser sends any potential errors to the server module 204 and stops processing.
6. Config Parser parses the uploaded config.
7. Config Parser creates objects from the config and stores them inside the database 110.
8. Config Parser informs the server module 204 of the completed task.
9. Server module 204 indicates to the Dictionary Parser to start its processing.
10. Dictionary Parser loads the schema for validating the config.
11. Dictionary Parser validates the config.
12. Dictionary Parser sends any potential errors to the server module 204 and stops processing.
13. Dictionary Parser parses the uploaded config.
14. Dictionary Parser creates objects from the config and stores them inside the database 110.
15. Dictionary Parser informs the server module 204 of the completed task.
16. Server module 204 indicates to the package parser module to start its processing.
17. Package parser module loads the schema for validating the config.
18. Package parser module validates the config.
19. Package parser module sends any potential errors to the server module 204 and stops processing.
20. Package parser module parses the uploaded config.
21. Package parser module creates objects from the config and stores them inside the database 110.
22. Package parser module informs the server module 204 of the completed task.
23. Server module 204 indicates to the user that the authenticator module 202 completed its tasks.

Exemplary process steps that may be carried out by the authenticator module 202 during user upload of packages include:

1. User selected a file to upload containing test package data.
2. Server module 204 forwards the contents of the file to the package parser module.
3. Package parser module loads the schema relevant to test package data.
4. Package parser module validates the uploaded test packages against the schema.
5. Package parser module returns any potential errors with the uploaded test packages.
6. Package parser module parses any test packages without errors.
7. Package parser module creates objects that are saved inside the database 110.
8. Package parser module sends positive acknowledgement to the server module 204 indicating completion.
9. Server module 204 displays the potential errors with any uploaded test packages from the file, otherwise, it displays success.

In some embodiments the system 100 can include the database 110. For instance, the database 110 can be a component of or used in combination with the processor 102 or memory 104. The database 110 can be configured to store any one or combination of data objects used throughout implementation of the framework. These data objects are created at the start of the implementation and through parsing of the configuration files. They are also created during the lifecycle of each test case and test package. The database 110 can be configured to track the states of all test cases and test packages.

The processor 102 can include a server module 204 configured to monitor traffic on the network 108. The server module 204 can be configured as a web server module, for example. The server module 204 can process and handle at least a portion of network traffic. If configured as a web server module, it can receive input in the form of page requests and GET/POST commands from a user. The server module 204 can also perform security evaluations on the initial request to the server, ensure proper authentication prior to providing access to a web-based view of the framework, allow use of multiple users with varying levels of authority, etc.

Figure 6:
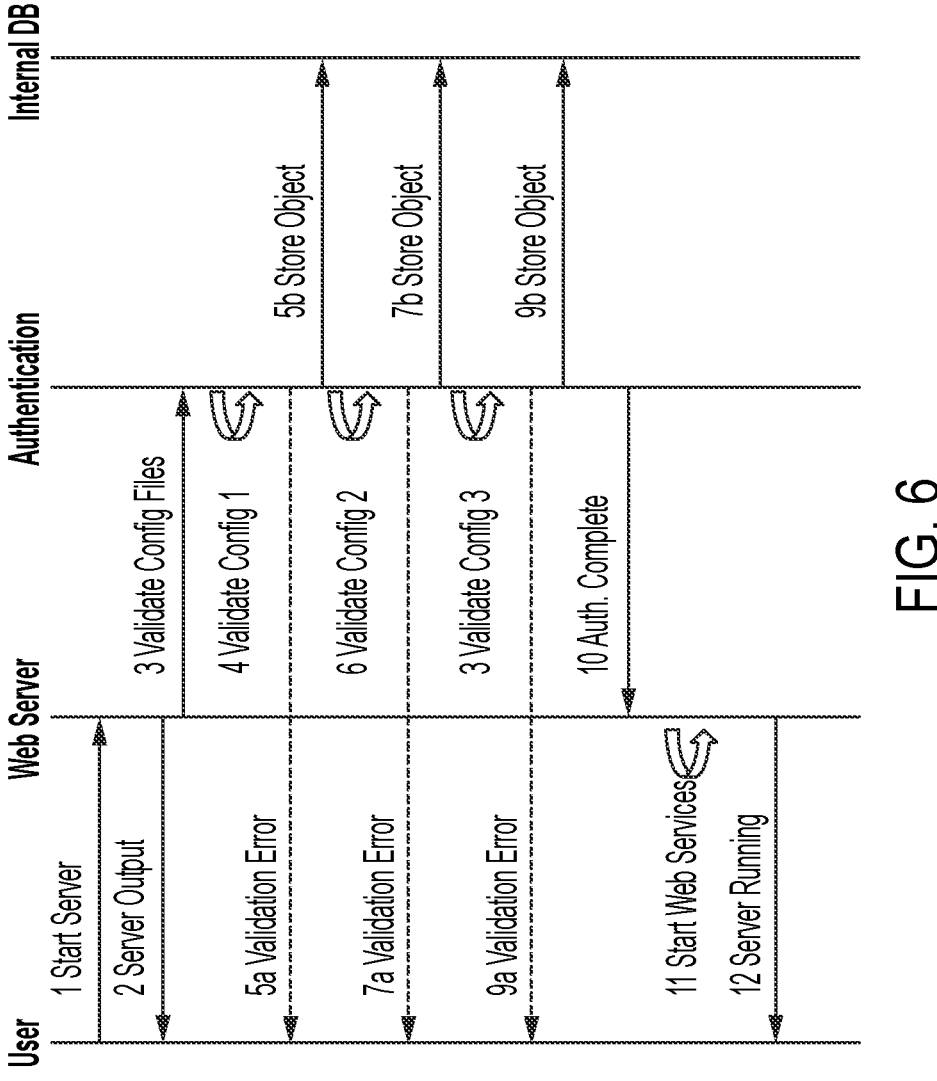
FIG. 6 shows an exemplary initial set up flow diagram.

Referring to FIG. 6, an exemplary initial set up flow diagram is shown.

Exemplary process steps that may be carried out by the server module 204 include:

1. User runs the script to start the server module 204.
2. Server module 204 displays text output of the startup process.

3. Server module 204 informs the authenticator module 202 to start validating the configuration files 4. Authenticator module 202 starts to validate the first configuration file against a stored schema file.

5. Two distinct paths.
   a. Authenticator module 202 detected an error in the validation and informs the user of the error and stops.
   b. Authenticator module 202 did not discover an error and creates an object that is passed to the database 110.

6. Authenticator module 202 starts to validate the second configuration file against a second stored schema file.

7. Two distinct paths.
   a. Authenticator module 202 detected an error in the validation and informs the user of the error and stops.
   b. Authenticator module 202 did not discover an error and creates an object that is passed to the database 110.

8. Authenticator module 202 starts to validate any historic data against a third stored schema file.

9. Two distinct paths.
   a. Authenticator module 202 detected an error in the validation and informs the user of the error and stops.
   b. Authenticator module 202 did not discover an error and creates an object that is passed to the database 110 110.

10. Authenticator module 202 informs the server module 204 that the authentication process has completed.

11. Server module 204 starts up necessary services including mapping web pages, mapping web requests, initiating web security, creating user hash database, opening a communication port, and starting the web service on the specific address and port.

12. Server module 204 indicates status for each service established in step 11.

The processor 102 can include a test runner module 206 configured to execute the test data package and test case. The server module 204 can be configured to inform the test runner module 206 when to begin execution. In an exemplary embodiment, the test runner module 206 can include five modules: a BeforeAfterExecution module, an ExternalFileExecutor module, a FileSave module, a TestRunnerMain, and a VulnParser module.

BeforeAfterExecution Module

This module can be called from the TestRunnerMain module. It can be activated at the beginning and ending of each test case and test package. It can be used to run specific script files that are specified by the user inside the first configuration file that was parsed by the authenticator module 202. This can be used to detect any changes in the system based on testing.

ExternalFileExecutor Module

This module can be configured to create the necessary processes to handle communication with the security module 106—e.g., the test runner module 206 can be configured to create and execute a communication protocol to establish and maintain a communication with the security module 106. The ExternalFileExecutor module can be configured to receive the test case object from TestRunnerMain module and determine the necessary steps to create the communication channel along with validating the parameter values. It can also be responsible for listening to the open channels for communication. It can be configured to forward the associated messaging to the proper channels, as well as differentiate between normal text output, vulnerability output, error output, and communication requiring user interaction.

FileSave Module

This module can be configured to store pertinent log information obtained by the ExternalFileExecutor module in a log file. The system 100 can be configured to allow the log file to be accessed at any time. The FileSave module can be configured to format log information pertaining to the test package. It can be configured to create both a system log and a JSON log file highlighting the various object values used during testing. It can be called at the completion of each test package execution.

TestRunnerMain Module

This module can be configured to establish a queue that, once instantiated, executes a loop through one or more test package and its associated test case. The module can be configured to check the state of the server module 204 to ensure it should continue. The TestRunnerMain module can be configured to pass off tasking to the BeforeAfterExecution and ExternalFileExecutor modules to perform the necessary processing for the current step in the test case. At the completion of each test package, the TestRunnerMain module can be configured to call the report generator module 208 to create the output.

VulnParser Module

This module can be activated by the ExternalFileExecutor module upon receipt of the vulnerability output. The VulnParser module can be configured to parse values from the various fields and create a data object that is associated with the current test case and test package. This data object can be stored in memory 104 or in the database 110.

Figure 5:
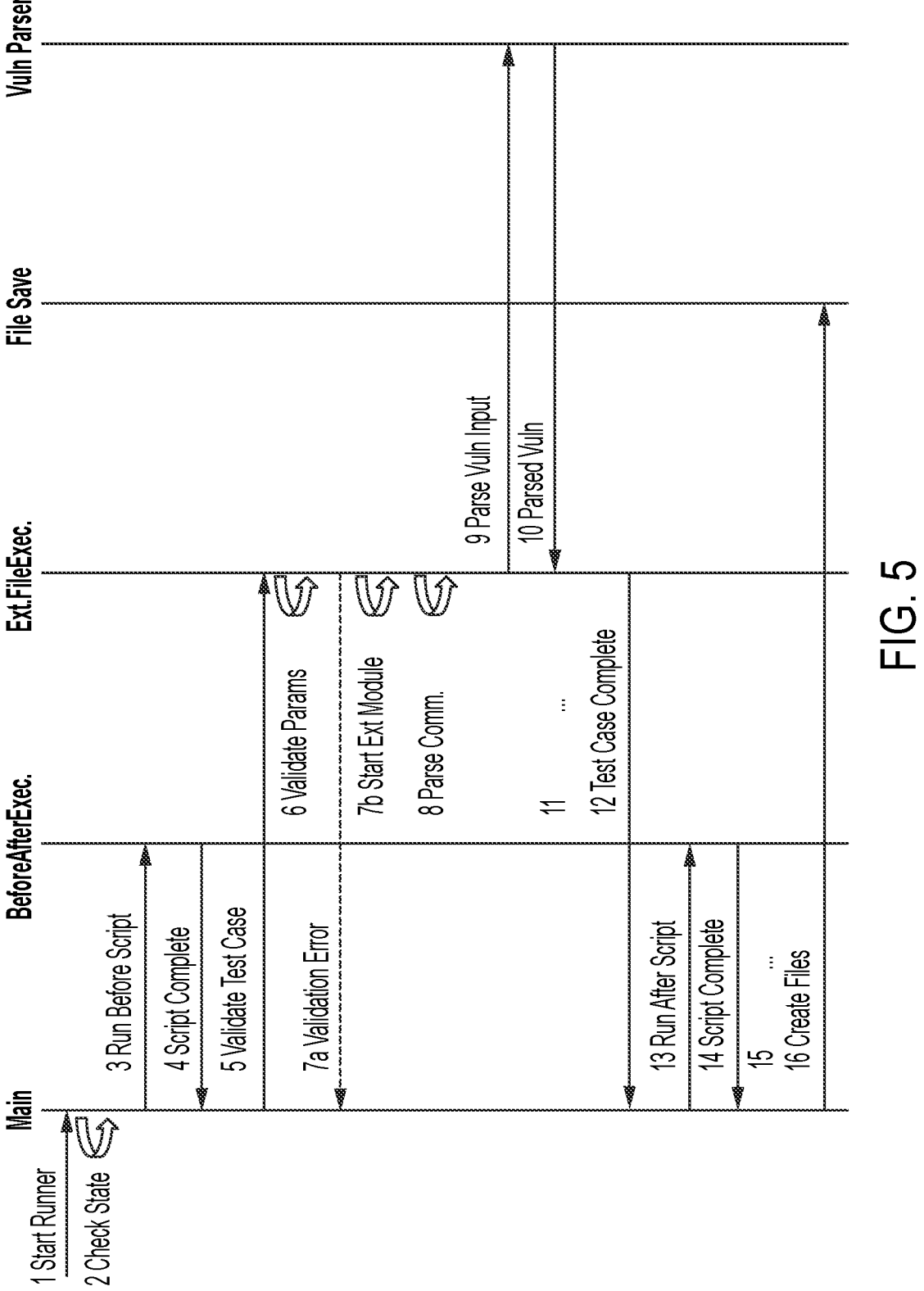
FIG. 5 shows an exemplary test runner module flow diagram.

Referring to FIG. 5, an exemplary test runner module 206 flow diagram is shown.

Exemplary process steps that may be carried out by the test runner module include:

1. Test runner module 206 receives the start command from either a timer or from user input.

2. Test runner module 206 checks state to ensure it should continue processing.

3. Test runner module 206 tasks the BeforeAfterExec component to perform any before execution scripts.

4. BeforeAfterExec component responds with the completion of the task.

5. Test runner module 206 passes the test case object to the ExternalFileExecutor.

6. ExternalFileExecutor validates the parameters and determines the proper command to run the program.

7. Two distinct paths.
   a. ExternalFileExecutor detected an error with a parameter and replies that it is skipping the test which jumps to step 12.
   b. ExternalFileExecutor did not discover any parameter errors and creates the process establishing communication with the security module.

8. ExternalFileExecutor listens for communication from the security module and determines the type of input.

9. ExternalFileExecutor received vulnerability input from a security module and forwards it to the Vulnerability Parser.

10. Vulnerability Parser replies with the parsed values.

11. Steps 7-9 are repeated as the ExternalFileExecutor detects input from the security module.

12. ExternalFileExecutor informs the test runner module 206 that the test case completed.

13. Test runner module 206 informs the BeforeAfterExec component to perform any after execution scripts.

14. BeforeAfterExec component responds with the completion of the task.

15. Steps 2-14 are repeated for each test case in the test package.

16. The test runner module 206 informs the File Save to save the test package information into log files along with informing the report generator module 208 to create the deliverable output. At this moment, the test runner module 206 repeats steps 2-15 for each test package currently in the queue.

Figure 7:
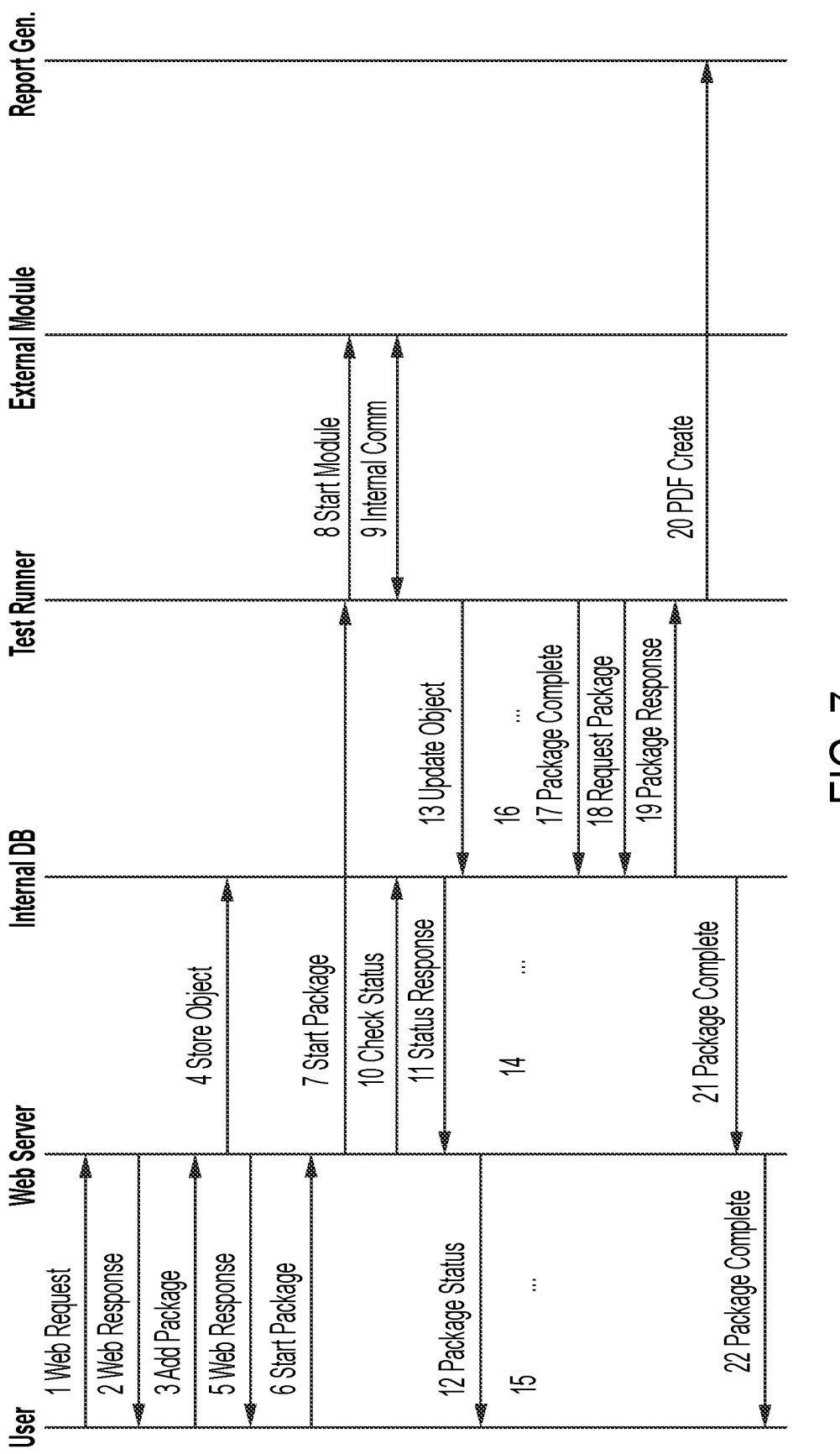
FIG. 7 shows an exemplary flow diagram for test package creation.

FIG. 7 shows exemplary flow diagram for test package creation. Exemplary process steps that may be carried out for test package creation include:

1. User logs into the web address for the hosted Platform.

2. Web Platform returns login page and grants access after authenticated.

3. User performs actions to add a new test package containing test cases and their parameter values.

4. Server module 204 creates an object and passes the test package to the database 110.

5. Server module 204 responds to the user informing of the successful addition of the test package.

6. User performs the steps to start the test package.

7. Server module 204 forwards the start action to the test runner module 206 to begin processing.

8. Test runner module 206 starts a process to communicate with the security module.

9. Security module 106 passes information back and forth to the Test runner module 206 during active processing.

10. Server module 204 periodically requests the status of test package inside the database 110 110

11. Database 110 responds with its test package information.

12. Server module 204 parses the information and displays it for the user in real-time.

13. Test runner module 206 provides the database 110 with any communication between the test runner module 206 and security module 106.

14. Steps 10 and 11 are repeated until completion of the test runner module 206.

15. Step 12 is repeated until the completion of the test runner module 206.

16. Step 13 is repeated until the completion of the test runner module 206.

17. Test runner module 206 informs the database 110 110 of the completion of the final test case for the test package.

18. Test runner module 206 requests the newly completed test package.

19. Database 110 responds with the requested test package.

20. Test runner module 206 informs the report generator module 208 to create a PDF report for the information provided inside the test package. The test runner module 206 transitions its active status into an idle state.

21. Database 110 replies to a 'Check Status' request, Step 10, with the indication of the completed test package.

22. Server module 204 forwards the completion status to the user allowing the user to view the created PDF report.

As noted above, the processor 102 can include a server module 204 configured to monitor traffic on the network 108, and a test runner module 206 configured to execute the test data package and test case. The test runner module 206 can also be configured to monitor an operational state of the server module 204.

In some embodiments, the instructions can cause the processor 102 to configure the output as any one or combination of a hard copy report (e.g., the processor 102 can capture the output and encapsulated the results into a PDF document, which can be a single PDF document), a display of a graphical user interface, a signal, an audio or visual alarm, etc. There can be one or more vulnerability outputs for a given test case and test data packet. The output can be a compilation or summary of any one or combination of vulnerability outputs. Information of the output can include testing procedures or results, timestamps, discovered vulnerabilities, vulnerability reports per network function, remediation steps (e.g., necessary or recommended actions to fix, address, mitigate, etc. gaps in network security), etc. This captured output can be vital in providing a deterministic view of the network 108 and its potential vulnerabilities. Generation of the output can be automatic and can be configured so as to provide results per subset of executed security modules 106.

The processor 102 can include a report generator module 208 configured to generate the output. The report generator module 208 can be called by the TestRunnerMain module at the completion of each test package, and be configured to parse the test package data. The output of the report generator module 208 can be information highlighting discovered vulnerabilities by breaking apart the data object(s) into human readable content that is easier to understand for the end user. The information can also be grouped by virtualized network function (VNF), highlighting the total test cases that exercised the VNF, any vulnerabilities discovered for the specific VNF, etc. The report generator module 208 can be configured to generate the output in real time, periodically, on-demand, etc. Providing output in this manner can be vital in determining the network's 108 security posture (health/status/performance monitoring and vulnerability/security evaluations) at both a system level and at the network function level. The information in the output can facilitate evaluations that monitor all aspects of the network from the physical hardware used for routing down to the core elements of the network 108.

In some embodiments, the instructions can cause the processor 102 to activate more than one security module 106. In some embodiments, the instructions can cause the processor 102 to activate more than one security module 106 in serial manner, a parallel manner, or in any combination thereof. Each security module 106 can be associated with a parsed entry during from the authenticator module 202. Thus, each security modules 106 can be treated as external to the framework, but is activated by the test runner module 206. For this reason, a security module 106 may be referred to herein as an external module. Any of the security modules 106 can be updated and developed without any modification to the framework outside of any updates to associated parameter requirements. Modification and development of security modules 106 can allow for tailoring or molding the security modules 106 so as to test differently, perform deeper penetration capabilities, etc.—e.g., the security modules 106 are not bound by the constructs of security and vulnerability assessments. New security modules 106 only require an update to a configuration file specifying the path to the security module 106 and any associated parameters necessary to execute the security module 106.

It is contemplated for the network 108 to be a cellular fifth generation (5G) network, but the system 100 can be used to operate on any type of network and other network generations. Known systems and methods for penetration testing, and in particular penetration testing 5G networks, can only focus on the cloud aspects of the 5G network. The inventive framework, however, can monitor all aspects of the network 108 while discovering vulnerabilities on the core elements of the network 108. Existing systems and methods are unable to gather or ascertain information pertaining to evaluations inside of the 5G core.

Embodiments can relate to a method for penetration testing a network 108. The method can involve using a configuration file to treat a security module 106 as an operating module that is external to a system 100 executing the method by defining a data object from the configuration file. The method can involve activating the security module 106. The method can involve executing, based on the data object, a test data package and a test case to identify a penetration vulnerability of the network 108. The configuration file can include a first configuration file and a second configuration file. The first configuration file can include information pertaining to defining the network. The second configuration file can include information pertaining to the security module. The method can involve parsing data from the configuration file(s) to generate the data object.

The method can involve revising a command line of the first configuration file when the security module 106 is an operating module that has not been activated by the system 100 to facilitate activation of the security module 106. This allows the framework to be extensible—e.g., the framework can be performed across one or more multiple networks and configurations. The security modules 106 can be updated or even replaced with different security modules 106 performing different actions. With an update, new, or replaced security module 106, an entry into an xml configuration file can allow for implementation of the security module 106, allowing implementation across various networks performing various assessments. The framework is not confined to a single network configuration. The framework captures and parses the new/different security modules 106 and their output—i.e., the framework can be used to expand its testing suite without modification outside of the configuration file. Working with the configuration files allows the system 100 to treat the security modules 106 as external modules, allowing for continual expansion and growth (expansion of additional or different security modules 106 to perform security evaluations). This can allow for continual enhancement of the system 100. This can also allow for rapid development of additional security modules 106.

Embodiments can relate to a method for penetration testing a network 108. The method can involve receiving a first configuration file including network configuration information pertaining to defining a network 108, and defining log gathering procedures based on the network configuration information. The method can involve locating a second configuration file including security module information pertaining to a security module 106, and defining a test case based on the security module information, the test case including a test data package. The method can involve parsing data from the first configuration file and the second configuration file to generate a data object. The method can involve activating the security module 106 to evaluate a security of the network 108, and produce a vulnerability output. The method can involve executing within the security module 106, based on the data object, the test data package and the test case to identify a penetration vulnerability associated with the vulnerability output of the network 108. The method can involve outputting, via a user interface 800, the penetration vulnerability of the network. Identifying the penetration vulnerability of the network 108 can involve correlating penetration vulnerability to a network function inside a core network of the network 108.

It will be understood that modifications to the embodiments disclosed herein can be made to meet a particular set of design criteria. For instance, any of the components, features, or steps of the system or method can be any suitable number or type of each to meet a particular objective. Therefore, while certain exemplary embodiments of the systems and methods disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiments. Thus, the components, features, and/or configurations of the various embodiments can be combined in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein. Additionally, the disclosure of a range of values is a disclosure of every numerical value within that range, including the end points.

What is claimed is:

1. A system for network penetration testing, the system comprising:

a processor;

computer memory having instructions stored thereon that when executed will cause the processor to:

receive a first configuration file including network configuration information pertaining to defining a network, and define log gathering procedures based on the network configuration information;

locate a second configuration file including security module information pertaining to a security module, and define a test case based on the security module information, the test case including a test data package;

parse data from the first configuration file and the second configuration file to generate a data object;

associate the security module with the parsed data;

activate the security module to evaluate a security of the network, and produce a vulnerability output;

execute within the security module, based on the data object, the test data package and the test case to identify a penetration vulnerability associated with the vulnerability output of the network; and output, via a user interface, the penetration vulnerability of the network.

2. The system of claim 1, wherein:

the processor includes an authenticator module configured to receive the first configuration file, locate the second configuration file, and parse data from the first configuration file and the second configuration file.

3. The system of claim 2, wherein:

the instructions will cause the processor to transmit the data object created by the authenticator module to a database.

4. The system of claim 3, comprising:

the database.

5. The system of claim 1, wherein:

the processor includes a server module configured to monitor traffic on the network.

6. The system of claim 1, wherein:

the processor includes a test runner module configured to execute the test data package and test case.

7. The system of claim 6, wherein:

the test runner module is configured to create and execute a communication protocol to establish and maintain a communication with the security module.

8. The system of claim 1, wherein:

the processor includes a server module configured to monitor traffic on the network; and the processor includes a test runner module configured to:

execute the test data package and test case; and monitor an operational state of the server module.

9. The system of claim 1, wherein:

the instructions will cause the processor to configure the output as any one or combination of a hard copy report, a display of a graphical user interface, a signal, or an audio or visual alarm.

10. The system of claim 9, wherein:

the processor includes a report generator module configured to generate the output.

11. The system of claim 1, wherein:

the instructions will cause the processor to activate more than one security module.

12. The system of claim 11, wherein:

the instructions will cause the processor to activate more than one security module in serial manner, a parallel manner, or in any combination thereof.

13. The system of claim 1, wherein:

the network is a 5G network.

14. A method for penetration testing a network, the method comprising:

using a configuration file to treat a security module as an operating module that is external to a system executing the method by defining a data object from the configuration file that associates the security module with parsed data of the configuration file;

activating the security module;

executing, based on the data object, a test data package and a test case to identify a penetration vulnerability of the network.

15. The method of claim 14, wherein:

the configuration file includes a first configuration file and a second configuration file.

16. The method of claim 15, wherein:

the first configuration file includes information pertaining to defining the network; and the second configuration file includes information pertaining to the security module.

17. The method of claim 14, comprising:

parsing data from the configuration file to generate the data object.

18. The method of claim 17, comprising:

revising a command line of the configuration file when the security module is an operating module that has not been activated by the system to facilitate activation of the security module.

19. The method of claim 14, wherein:

the network is a 5G network.

20. A method for penetration testing a network, the method comprising:

receiving a first configuration file including network configuration information pertaining to defining a network, and defining log gathering procedures based on the network configuration information;

locating a second configuration file including security module information pertaining to a security module, and defining a test case based on the security module information, the test case including a test data package;

parsing data from the first configuration file and the second configuration file to generate a data object;

associating the security module with the parsed data;

activating the security module to evaluate a security of the network, and produce a vulnerability output;

executing within the security module, based on the data object, the test data package and the test case to identify a penetration vulnerability associated with the vulnerability output of the network; and outputting, via a user interface, the penetration vulnerability of the network.

21. The method of claim 20, wherein:

identifying the penetration vulnerability of the network involves correlating penetration vulnerability to a network function inside a core network of the network.

22. The method of claim 20, wherein:

the network is a 5G network.

*    *    *    *    *